(12) United States Patent
Brütt et al.

(10) Patent No.: US 12,049,209 B2
(45) Date of Patent: Jul. 30, 2024

(54) VALVE ARRANGEMENT OF A TOWING VEHICLE FOR CONTROLLING A PNEUMATIC BRAKE SYSTEM OF A TRAILER VEHICLE AND A METHOD FOR CONTROLLING IT

(71) Applicant: WABCO Europe BVBA, Brussels (BE)

(72) Inventors: Mirko Brütt, Springe (DE); Ivo Laskawy, Hamburg (DE); Jan Spremberg, Wennigsen (DE); Lars Volker, Seelze (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 279 days.

(21) Appl. No.: 17/447,719

(22) Filed: Sep. 15, 2021

(65) Prior Publication Data

US 2022/0080939 A1     Mar. 17, 2022

(30) Foreign Application Priority Data

Sep. 17, 2020   (DE) .................... 10 2020 124 225.5

(51) Int. Cl.
  *B60T 15/18*   (2006.01)
  *B60T 13/66*   (2006.01)
  *B60T 13/68*   (2006.01)
(52) U.S. Cl.
  CPC .......... *B60T 15/182* (2013.01); *B60T 13/662* (2013.01); *B60T 13/683* (2013.01)
(58) Field of Classification Search
  CPC .... B60T 13/263; B60T 13/662; B60T 13/683; B60T 15/182

(Continued)

(56) References Cited

U.S. PATENT DOCUMENTS 5,061,015 A * 10/1991 Cramer ................ B60T 13/263
                                                   303/7
2015/0239441 A1* 8/2015 Klostermann ........ B60T 11/108
                                                   303/7

(Continued)

FOREIGN PATENT DOCUMENTS

DE    1938201 A1    2/1971
DE    3431674 A1    3/1986

(Continued)

OTHER PUBLICATIONS

WABCO Publication No. 815 020 082 3, "Pneumatic Braking System Agriculture and Forestry—Product Catalogue," Bern, Switzerland, 2017, Edition 11, Version 1, 266 pages, URL: https://www.wabco-customercentre.com/catalog/docs/8150200823.pdf.

*Primary Examiner* — Robert A. Siconolfi
*Assistant Examiner* — San M Aung
(74) *Attorney, Agent, or Firm* — Finch & Maloney PLLC

(57) ABSTRACT

A valve arrangement (14.2) of a tractor vehicle (2) for controlling a pneumatic brake system of a trailer vehicle (4) includes a trailer control valve (16) with a reservoir pressure input (p11) for the introduction of reservoir compressed air and a reservoir pressure output (p21) for the controlled discharge of reservoir compressed air. The reservoir pressure output is pneumatically connected to a "reservoir" coupling head (6) of the tractor vehicle. A shut-off and ventilation valve (98) is arranged in a reservoir pressure line (48) upstream of the "reservoir" coupling head. Before connecting an associated coupling head of the trailer vehicle (4) to the "reservoir" coupling head of the tractor vehicle, the feed of reservoir compressed air to the "reservoir" coupling head can be shut off to ventilate the "reservoir" coupling head. After reconnecting the associated coupling head, the "reservoir" coupling head can be charged again.

24 Claims, 14 Drawing Sheets

(58) Field of Classification Search
USPC ...................................................... 303/118.1
See application file for complete search history.

(56) References Cited

U.S. PATENT DOCUMENTS

| | | | | |
|---|---|---|---|---|
| 2017/0174197 A1* | 6/2017 | Eberling | ............... | B60T 13/403 |
| 2019/0118788 A1* | 4/2019 | Bruett | .................. | B60T 13/263 |
| 2021/0171001 A1* | 6/2021 | Leinung | ............... | B60T 13/683 |

FOREIGN PATENT DOCUMENTS

| | | | | |
|---|---|---|---|---|
| DE | 3545021 A1 | | 6/1987 | |
| DE | 3703639 A1 | | 8/1988 | |
| DE | 19931162 A1 | | 1/2001 | |
| DE | 102007047691 A1 | * | 4/2009 | ............ B60T 13/263 |
| DE | 102007047691 A1 | | 4/2009 | |
| DE | 102009053815 A1 | | 5/2011 | |
| DE | 102010010605 A1 | | 9/2011 | |
| DE | 102014002614 A1 | | 8/2015 | |
| DE | 102017007781 A1 | | 2/2019 | |
| DE | 102017118529 A1 | | 2/2019 | |
| DE | 102018104143 A1 | | 8/2019 | |
| DE | 102018123750 A1 | | 3/2020 | |
| DE | 102019100869 A1 | | 7/2020 | |
| EP | 3275746 A1 | | 1/2018 | |
| GB | 2543037 A | * | 4/2017 | ............ B60T 13/263 |
| WO | WO-2018007799 A1 | * | 1/2018 | ............ B60T 13/261 |

* cited by examiner

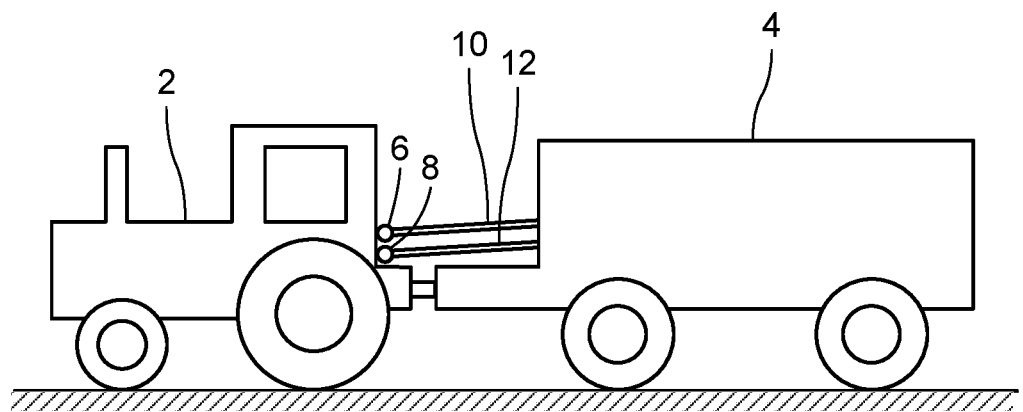
Fig.2a
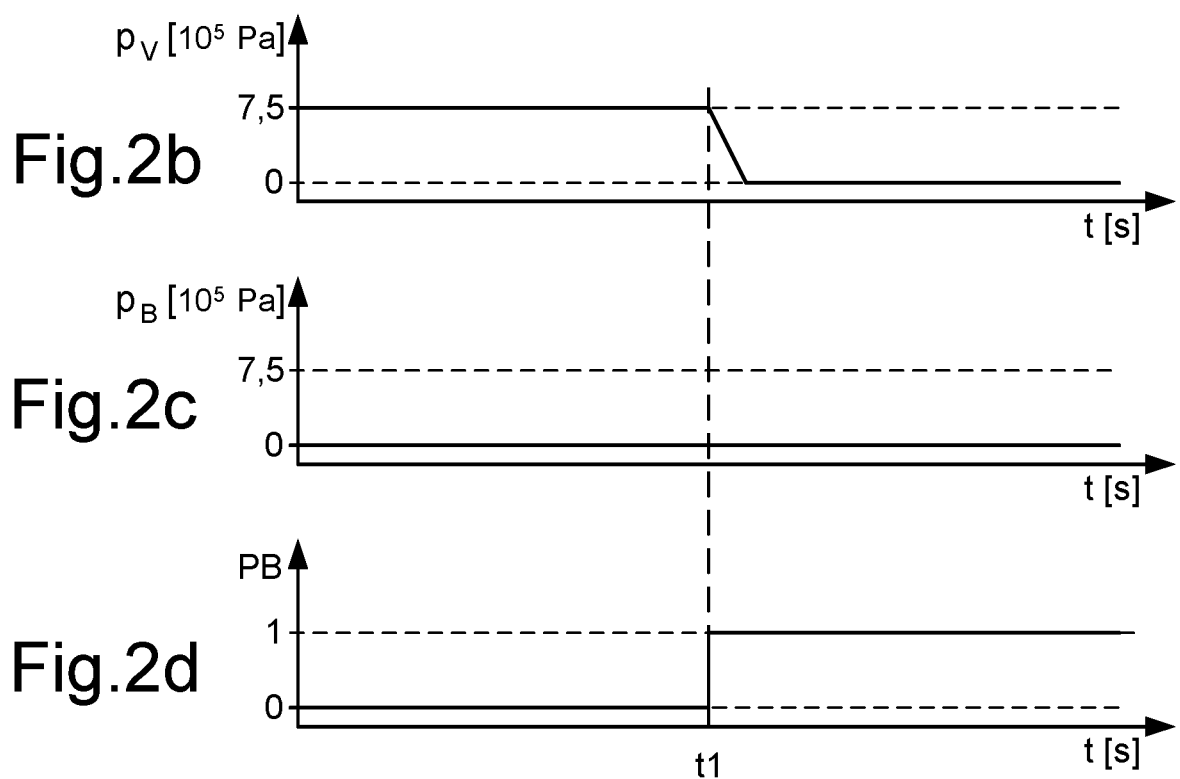
Fig.2b
Fig.2c
Fig.2d

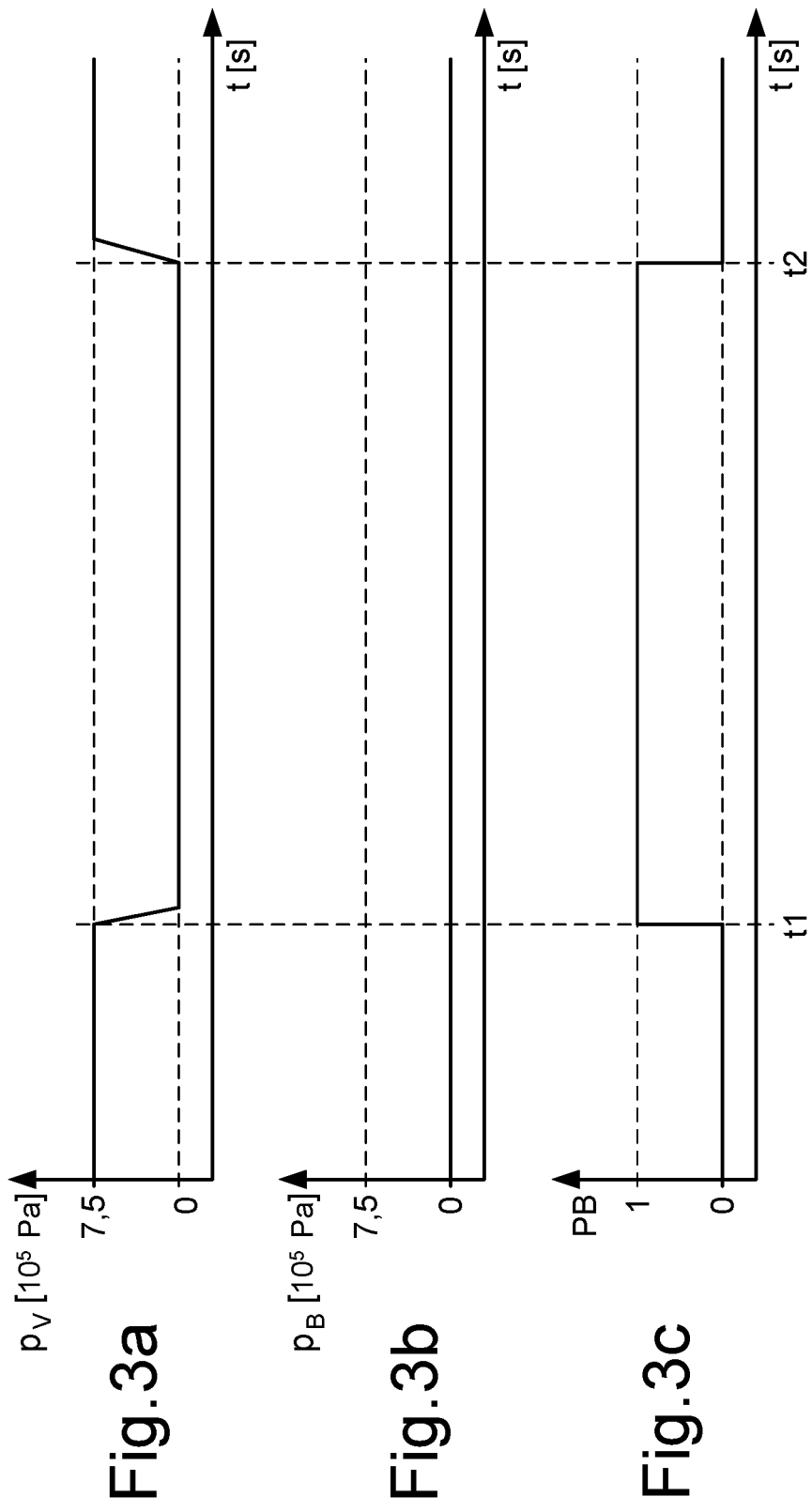

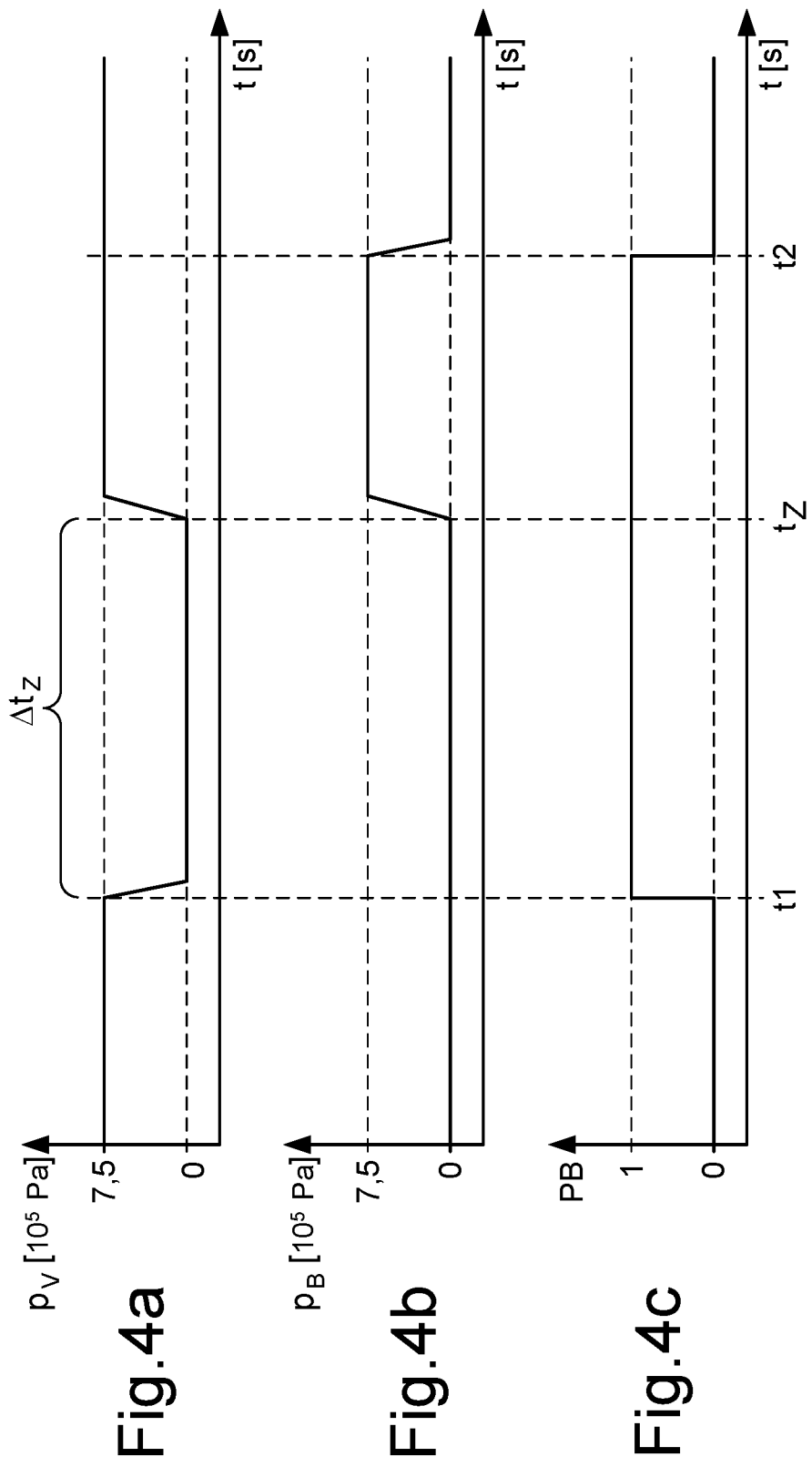

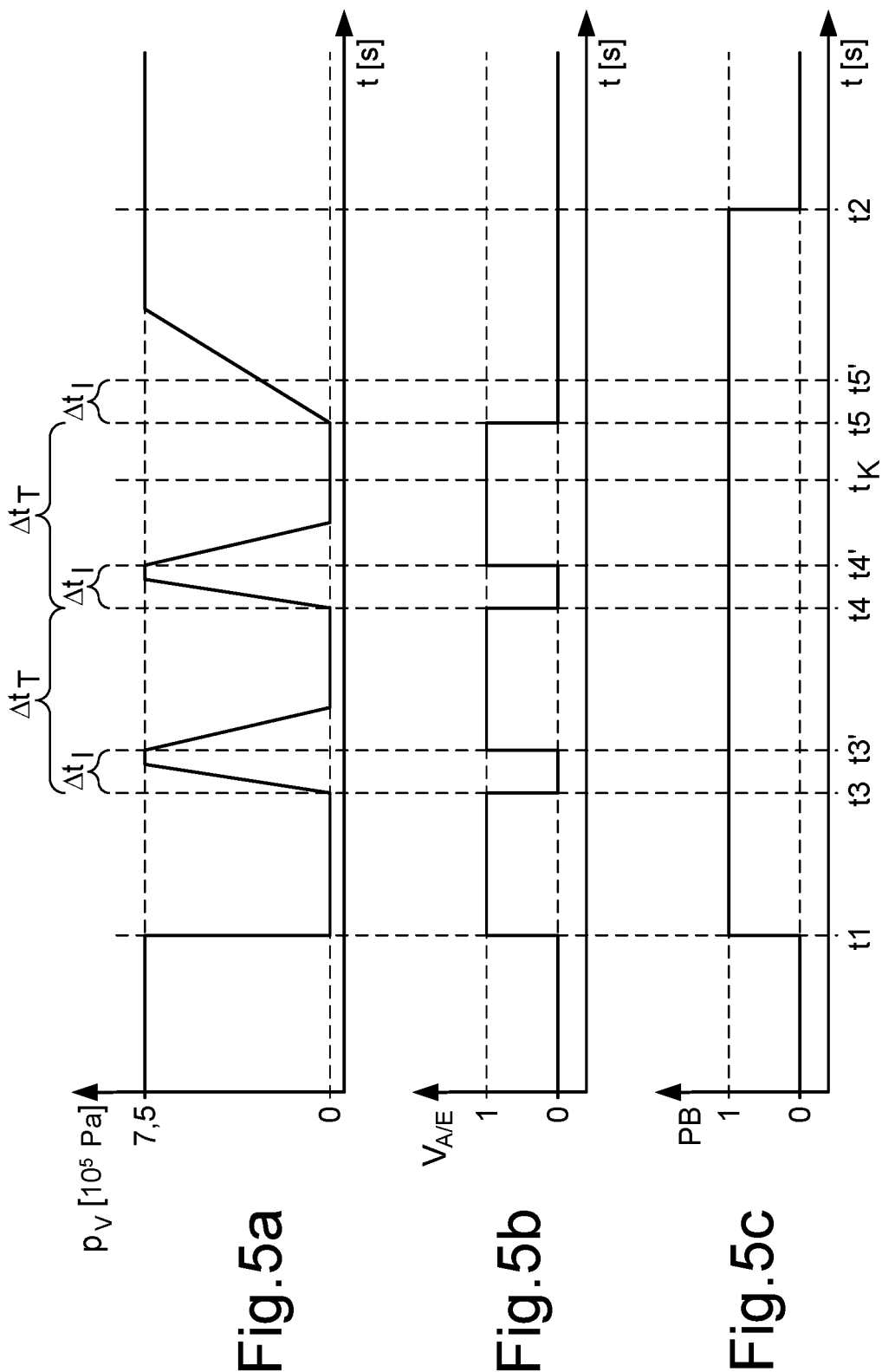

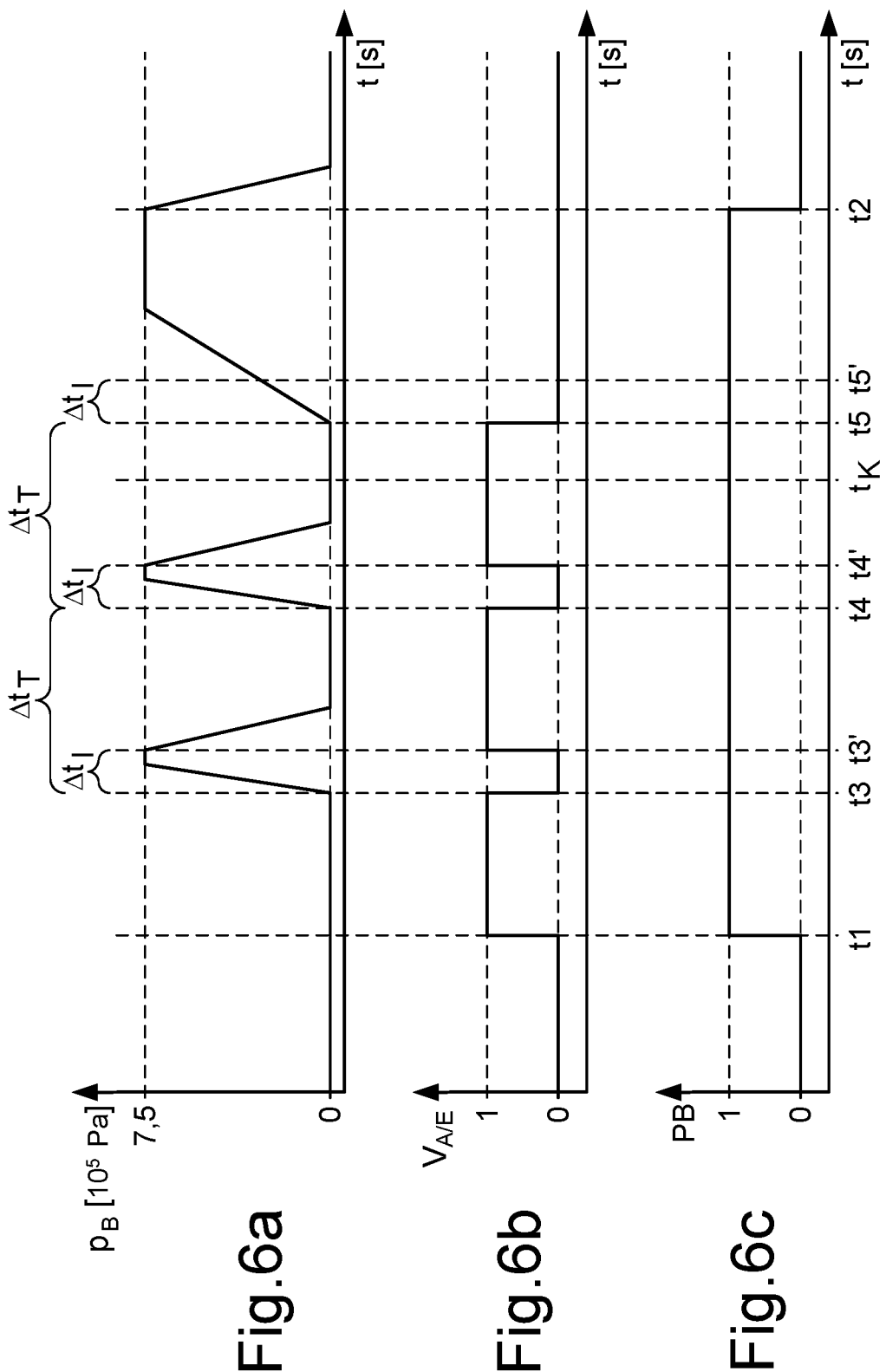

VALVE ARRANGEMENT OF A TOWING VEHICLE FOR CONTROLLING A PNEUMATIC BRAKE SYSTEM OF A TRAILER VEHICLE AND A METHOD FOR CONTROLLING IT

TECHNICAL FIELD

The present disclosure relates to a valve arrangement of a tractor vehicle for controlling a pneumatic brake system of a trailer vehicle, the valve arrangement having a trailer control valve with a reservoir pressure input for the introduction of reservoir compressed air and a reservoir pressure output for the controlled discharge of reservoir compressed air, and in which the reservoir pressure output is pneumatically connected to a "reservoir" coupling head of the tractor vehicle. The present disclosure furthermore relates to a method for controlling a valve arrangement of the type during the coupling of a trailer vehicle to a tractor vehicle.

BACKGROUND

Modern tractor vehicles such as heavy goods vehicles and semitrailer tractors, which are intended predominantly for travel on paved roads and freeways, commonly have a compressed-air-operated brake system with electronic control. By contrast, modern tractor vehicles such as agricultural tractors that are configured for use on surfaces other than paved roads and tracks are commonly equipped with hydraulic brake systems with electronic control. The brake systems of both generic types of vehicle have at least one valve arrangement for controlling a pneumatic brake system of a trailer vehicle which can be coupled on, which at least one valve arrangement has a trailer control valve with electrically controlled inlet valves and outlet valves and has a pneumatically controlled relay valve and a backup valve with an electrically controlled redundancy valve and with a brake-pressure-controlled relay valve.

During normal operation, in the trailer control valve, a pneumatic reservoir pressure generated by a compressor and treated in a compressed-air supply system is conducted via a breakaway valve to a "reservoir" coupling head (red) of the tractor vehicle. Furthermore, in a manner dependent on an electronic brake value signal detected by an electronic brake value sensor, a control pressure set by way of inlet valves and outlet valves is used in the relay valve of the trailer control valve to set a corresponding brake control pressure, which is conducted via a shuttle valve to the "brake" coupling head (yellow) of the tractor vehicle.

In the event of a failure of the electronic controller or in the absence of an electronic brake value signal, the deactivation of the inlet valves and outlet valves is performed in order to ventilate the control input of the associated relay valve and thus deactivate the trailer control valve. Furthermore, then, via the switch of a redundancy valve from a shut-off position into an open position, the reservoir pressure input or the brake control input of the relay valve located there is enabled, and thus the backup valve is activated. In the relay valve of the backup valve, in a manner dependent on the brake pressure measured on a brake line of the tractor vehicle, a brake control pressure for the trailer vehicle is set and is conducted via the shuttle valve to the "brake" coupling head (yellow). In this way, the function of the service brakes of the trailer vehicle is ensured even in the event of a failure of the electronic controller or in the event of an absence of the electronic brake value signal.

DE 10 2014 002 614 A1 has described several embodiments of a valve arrangement of the type of a hydraulically braked tractor vehicle for the control of the brake pressure of a pneumatically braked trailer vehicle, which valve arrangement, for the introduction of the brake control pressure conducted to the "brake" coupling head, has in each case one electronically controlled trailer control valve and one hydraulically controlled backup valve. Here, the trailer control valve and the backup valve are formed in each case as separate valve units, which are connected via pneumatic lines to one another and via electrical control lines to an electronic control unit.

For the use of the wheel brakes of the trailer vehicle in a parking brake function, the valve arrangement of a tractor vehicle may have an electronically controllable parking brake module which has at least one solenoid switching valve acting as a parking brake valve, via which an inverted control input of the trailer control valve or of the relay valve located there can be selectively charged with the reservoir pressure or ventilated. Here, the parking brake module is commonly formed not as a structurally separate unit but so as to be integrated into the overall system of the valve arrangement.

Such a brake system of a tractor vehicle is known for example from DE 10 2018 104 143 A1. In a valve arrangement in the document for the control of the pneumatic brake system of a trailer vehicle, an immobilizing brake module is provided, which has two parking brake valves connected in parallel and has a shuttle valve arranged at an output side. The parking brake valves are designed as 3/2 directional solenoid switching valves and are switchable independently of one another by separate switching units of an electronic control unit. Via the shuttle valve located there, the outputs of the parking brake valves are connected to the inverted control input on the relay valve of the trailer control valve. In the non-actuated, that is to say electrically deenergized, state of the two parking brake valves, the inverted control input of the relay valve is in an unpressurized state, which leads to the wheel brakes of the trailer vehicle being engaged in the parking brake function. In the event of a switch of one of the two parking brake valves, the inverted control input of the trailer control valve is charged with the reservoir pressure from a pressure-conducting supply line, which then leads to the wheel brakes of the trailer vehicle being released.

In order to couple a trailer vehicle, such as a drawbar trailer or a semitrailer, to a tractor vehicle, such as a heavy goods vehicle, an agricultural tractor or a semitrailer tractor, it is necessary, after the mechanical coupling of the trailer vehicle by way of the drawbar eye or the fifthwheel kingpin to the trailer or fifthwheel coupling of the tractor vehicle and the engagement of the parking brake of the tractor vehicle, for the coupling heads of the reservoir line and of the brake control line of the trailer vehicle to be connected to the associated coupling heads of the tractor vehicle. Whereas the coupling heads of a trailer vehicle commonly do not have any shut-off valves, the coupling heads of a tractor vehicle are each equipped with a respective spring-loaded shut-off valve, which can be brought into its open position by an axially inwardly displaceable thrust piece. Since, when the parking brake is engaged, both the reservoir line, leading to the "reservoir" coupling head, and the brake control line, leading to the "brake" coupling head, of the tractor vehicle are under pneumatic pressure, an escape of the compressed air is prevented by the shut-off valves located there in the coupling heads.

As an exemplary embodiment, DE 19 38 201 C3 describes a coupling head which is provided for a pneumatic valve arrangement of a tractor vehicle and which has a shut-off valve designed as a tipping valve. Two embodiments of a coupling head, which is provided for a pneumatic brake system of a trailer vehicle, without a shut-off valve are known for example from DE 199 31 162 B4.

During the connection of the coupling heads, in each case one trailer-side coupling head and one tractor-vehicle-side coupling head are brought with their connection bores coaxially together, are pushed against one another under axial pressure, with the shut-off valve in the tractor-vehicle-side coupling head being released, and are rotated counterclockwise through approximately 45° with respect to one another and thus locked in form-fitting fashion. During this connection process, compressed air inevitably escapes from the tractor-vehicle-side coupling head, which causes unpleasant noises and, owing to the acting force of compressed air, requires an increased force to press the coupling heads together, making the connection process more difficult.

SUMMARY

The present disclosure is therefore proposes a valve arrangement of a tractor vehicle of the type mentioned in the introduction, via which, during the coupling of a trailer vehicle to a tractor vehicle, the connection at least of the coupling head of the reservoir line and preferably also the connection of the brake control line of the tractor vehicle can be performed more comfortably and more easily than before. It is furthermore sought to describe a method for controlling a valve arrangement of the type during the coupling of a trailer vehicle to a tractor vehicle, for configuring the connection at least of the coupling head of the reservoir line and preferably also the connection of the brake control line of the trailer vehicle to be automated and to be performed more easily and comfortably.

The present disclosure accordingly relates to a valve arrangement of a tractor vehicle for controlling a pneumatic brake system of a trailer vehicle, the valve arrangement having a trailer control valve with a reservoir pressure input for the introduction of reservoir compressed air and a reservoir pressure output for the controlled discharge of reservoir compressed air, and in which the reservoir pressure output is pneumatically connected to a "reservoir" coupling head of the tractor vehicle. The trailer control valve may be of mechanically or electronically controllable form.

According to the present disclosure, to solve the stated problem, it is provided in the case of this valve arrangement that a shut-off and ventilation valve is arranged in a reservoir pressure line which is arranged pneumatically upstream of the "reservoir" coupling head, that, by means of this shut-off and ventilation valve, before the connection of an associated coupling head of the trailer vehicle to the "reservoir" coupling head of the tractor vehicle, the feed of reservoir compressed air to the "reservoir" coupling head can be shut off and the "reservoir" coupling head can be ventilated, and that, by means of the shut-off and ventilation valve, after the connection of the associated coupling head of the trailer vehicle to the "reservoir" coupling head of the tractor vehicle, the "reservoir" coupling head can be charged again with reservoir compressed air.

The shut-off and ventilation valve may be structurally integrated into the trailer control valve and arranged in a reservoir pressure line located there. According to another arrangement with the same action, it may be provided that the shut-off and ventilation valve is arranged downstream of the reservoir pressure output of the trailer control valve and upstream of the "reservoir" coupling head of the tractor vehicle. It is likewise possible, with the same action, for the shut-off and ventilation valve to be arranged upstream of the reservoir pressure input of the trailer control valve in an input-side reservoir pressure line that is external to the trailer control valve.

With the arrangement of a shut-off and ventilation valve in a reservoir pressure line upstream of the "reservoir" coupling head of the tractor vehicle, preferably pneumatically between the reservoir pressure output of the trailer control valve and the "reservoir" coupling head of the tractor vehicle, this coupling head of the tractor vehicle can be ventilated, and thus switched into an unpressurized state, before the connection of the associated "reservoir" coupling head of the trailer vehicle. Consequently, the "reservoir" coupling head of the trailer vehicle can be connected to the "reservoir" coupling head of the tractor vehicle without the escape of compressed air and thus without disturbing noises and without load being exerted by compressed-air forces. The connection of the "reservoir" coupling head of the trailer vehicle to the "reservoir" coupling head of the tractor vehicle is thus made considerably easier and more comfortable than has previously been the case in practice. Furthermore, increased compressed-air losses, which were hitherto possible during a coupling process carried out in an unskillful manner, are avoided.

In a further configuration of the construction defined by the present disclosure, a valve arrangement of a tractor vehicle for controlling a pneumatic brake system of a trailer vehicle is claimed, which valve arrangement has a trailer control valve with a reservoir pressure input for the introduction of reservoir compressed air and a reservoir pressure output for the controlled discharge of reservoir compressed air, wherein the reservoir pressure output is pneumatically connected to a "reservoir" coupling head of the tractor vehicle, and in which, by means of the trailer control valve, a brake control pressure can be set and conducted via a brake control output of the trailer control valve to a "brake" coupling head of the tractor vehicle, and with an electronically controllable parking brake module, via which an inverted control input of the trailer control valve can be ventilated for the actuation of the wheel brakes of the trailer vehicle in a parking brake function. The parking brake module has at least one solenoid switching valve which acts as parking brake valve. The one parking brake valve or the parking brake valves may be integrated directly into the valve arrangement of a tractor vehicle.

According to the present disclosure, this refined valve arrangement is characterized in that, in a brake control line between the brake control output and the "brake" coupling head and/or in a reservoir pressure line between the reservoir pressure output and the "reservoir" coupling head, there is arranged in each case one shut-off and ventilation valve via which, when the parking brake is activated, before the connection of the coupling heads of the trailer vehicle to the coupling heads of the tractor vehicle, the respective output of the trailer control valve can be shut off and the associated coupling head of the tractor vehicle can be ventilated, and via which, after the connection of the coupling heads of the trailer vehicle to the coupling heads of the tractor vehicle, the respective output of the trailer control valve is pneumatically connectable again to the associated coupling head of the tractor vehicle.

With the arrangement of a shut-off and ventilation valve in the brake control line between the brake control output and the "brake" coupling head and/or in the reservoir pressure line between the reservoir pressure output and the "reservoir" coupling head, the coupling heads of the tractor vehicle can be ventilated, and thus switched into an unpressurized state, before the connection of the coupling heads of the trailer vehicle. Consequently, the coupling heads of the trailer vehicle can be connected to the coupling heads of the tractor vehicle without the escape of compressed air and thus without disturbing noises and without load being exerted by compressed-air forces. The connection of the coupling heads of the trailer vehicle to the coupling heads of the tractor vehicle is thus made considerably easier and more comfortable than has previously been the case in practice. Furthermore, it is likewise the case that increased compressed-air losses, which were hitherto possible during a coupling process carried out in an unskillful manner, are avoided.

According to a first embodiment of the valve arrangement according to the present disclosure just described, it is provided that, both in the reservoir pressure line between the reservoir pressure output and the "reservoir" coupling head and in the brake control line between the brake control output and the "brake" coupling head, there is arranged in each case one manually actuatable shut-off and ventilation valve, and that the shut-off and ventilation valves are formed as 3/2 directional switching valves with an input connection connected to the respective output of the trailer control valve, an output connection connected to the respective coupling head, and a ventilation output, in the case of which, in the non-actuated state, the input connection is connected to the output connection and the ventilation output is shut off, and in the case of which, in the actuated state, the input connection is shut off and the output connection is connected to the ventilation output.

The shut-off and ventilation valves are each preferably manually switchable, and lockable in the actuated switching position, by means of a pushbutton. The locking of the shut-off and ventilation valves may be configured to be releasable either by means of a further actuation of the respective pushbutton or automatically after a predetermined holding time under the action of a respective valve-internal resetting spring.

According to a second embodiment of the valve arrangement, it is provided that an electrically actuatable shut-off and ventilation valve is arranged only in the reservoir pressure line between the reservoir pressure output and the "reservoir" coupling head, that the shut-off and ventilation valve is formed as 3/2 directional solenoid switching valve with an input connection connected to the reservoir pressure output, an output connection connected to the "reservoir" coupling head, and a ventilation output, that in the case of the shut-off and ventilation valve, in the electrically deenergized state, the input connection is connected to the output connection and the ventilation output is shut off, that in the case of the shut-off and ventilation valve, in the electrically energized state, the input connection is shut off and the output connection is connected to the ventilation output, and that the aeration and ventilation of the "brake" coupling head can be performed by actuation of the trailer control valve for this purpose by means of the mentioned parking brake module.

This embodiment of the valve arrangement is preferably used if the trailer control valve, the parking brake module and the shut-off and ventilation valve are connected to the same electronic control unit and can thus be directly controlled thereby.

According to a third embodiment of the valve arrangement, it is provided that, both in the reservoir pressure line between the reservoir pressure output and the "reservoir" coupling head and in the brake control line between the brake control output and the "brake" coupling head, there is arranged in each case one electrically actuatable shut-off and ventilation valve, that the shut-off and ventilation valves are formed as 3/2 directional solenoid switching valves with an input connection connected to the respective output of the trailer control valve, an output connection connected to the respective coupling head, and a ventilation output, that, in the case of the shut-off and ventilation valves, in the electrically deenergized state, the input connection is connected to the output connection and the ventilation output is shut off, and that, in the case of the shut-off and ventilation valves, in the electrically energized state, the input connection is shut off and the output connection is connected to the ventilation output.

This embodiment of the valve arrangement is preferably used if the parking brake module is connected to a different, second electronic control unit than the trailer control valve and the shut-off and ventilation valve, whereby the parking brake module can be controlled indirectly and only in a delayed manner by the electronic control unit for the trailer control valve and for the shut-off and ventilation valve.

According to a fourth embodiment of the valve arrangement, it is provided that, in the reservoir pressure line between the reservoir pressure output and the "reservoir" coupling head, there is arranged an electrically actuatable shut-off and ventilation valve, and in the brake control line between the brake control output and the "brake" coupling head, there is arranged a pneumatically pressure-controlled shut-off and ventilation valve, that the electrically actuatable shut-off and ventilation valve in the reservoir pressure line is formed as 3/2 directional solenoid switching valve with an input connection connected to the reservoir pressure output, an output connection connected to the respective coupling head, and a ventilation output, that in the case of the electrically actuatable shut-off and ventilation valve, in the electrically deenergized state, the input connection is connected to the output connection and the ventilation output is shut off, that in the case of the electrically actuatable shut-off and ventilation valve, in the electrically energized state, the input connection is shut off and the output connection is connected to the ventilation output, that the pneumatically pressure-controlled shut-off and ventilation valve in the brake control line is formed as a 3/2 directional switching valve with a control input connected to the reservoir pressure line between the shut-off and ventilation valve located there and the "reservoir" coupling head, an input connection connected to the brake control output, an output connection connected to the "brake" coupling head, and a ventilation output, and that, in the case of the pneumatically pressure-controlled shut-off and ventilation valve, when the control input is unpressurized, the input connection is shut off and the output connection is connected to the ventilation output, and, when the control input is pressurized, the input connection is connected to the output connection and the ventilation output is shut off.

This embodiment of the valve arrangement is also preferably used if the parking brake module is connected to a different, second electronic control unit than the trailer control valve and the shut-off and ventilation valve.

In order to automatically end the shutting-off of the outputs of the trailer control valve and the ventilation of the coupling heads, a pressure pulse can be introduced into the reservoir pressure line, leading to the "reservoir" coupling head, or into the brake control line, leading to the "brake" coupling head, by means of the respective shut-off and ventilation valve or by way of a corresponding actuation of the parking brake module. Here, if a steep pressure gradient arises owing to a small line volume, at least the respective coupling head of the trailer vehicle is not yet connected, such that the outputs of the trailer control valve should remain shut off and the coupling heads should continue to be kept in a ventilated state. If, by contrast, a shallow pressure gradient arises owing to a large line volume, at least the respective coupling head of the trailer vehicle is already connected, such that the shutting-off of the outputs of the trailer control valve and the ventilation of the coupling heads can be ended.

If the pressure pulse is to be introduced into the brake control line leading to the "brake" coupling head, it is provided in the third embodiment of the valve arrangement, in order to allow this control function, that, for the measurement of the brake control pressure prevailing at the "brake" coupling head, a pneumatic pressure sensor is connected to the brake control line between the shut-off and ventilation valve and the "brake" coupling head. In the case of the second embodiment of the valve arrangement, the brake control pressure prevailing at the "brake" coupling head can be measured by means of a pressure sensor which is commonly arranged within the trailer control valve and which is connected to a brake control line leading to the brake control output.

If the pressure pulse is to be introduced into the reservoir pressure line leading to the "reservoir" coupling head, it is provided in the second to fourth embodiment of the valve arrangement, in order to allow this control function, that, for the measurement of the brake control pressure prevailing at the "reservoir" coupling head, a pneumatic pressure sensor is connected to the reservoir pressure line between the shut-off and ventilation valve and the "reservoir" coupling head.

By contrast to the introduction of a pressure pulse into the brake control line, the introduction of a pressure pulse into the reservoir line however harbours the risk that the wheel brakes of the trailer vehicle are thus briefly released, whereby the vehicle combination may move slightly if the braking action of the parking brakes of the tractor vehicle is not high enough to stop the entire vehicle combination.

Finally, it may be provided that, by means of a manual actuation of an electrical switch that is connected in signal-transmitting fashion to the electronic control unit, an electrical energization of at least one of the two shut-off and ventilation valves is triggered by means of the control unit, whereby a ventilation of the "reservoir" coupling head and/or "brake" coupling head respectively arranged downstream thereof is performed. Consequently, the reservoir line and the brake control line of a trailer vehicle can, as described, be connected comfortably and quietly to the shut-off and ventilated coupling heads of the tractor vehicle.

In order to solve the method-related problem, the present disclosure proposes a control method which has the features of the independent method claim. Accordingly, aside from the valve arrangement discussed, the present disclosure also relates to a method for controlling a pneumatic brake system of a trailer vehicle by means of a valve arrangement of a tractor vehicle. The valve arrangement has a mechanically or electronically controllable trailer control valve, via which reservoir compressed air that is introduced into the valve arrangement via a reservoir pressure input can be conducted via a reservoir pressure output to a "reservoir" coupling head of the tractor vehicle.

The method according to the present disclosure is characterized in that, before the connection of an associated coupling head of the trailer vehicle to the "reservoir" coupling head of the tractor vehicle, the feed of reservoir compressed air to the "reservoir" coupling head of the tractor vehicle can be shut off and the "reservoir" coupling head of the tractor vehicle is ventilated. It is furthermore provided in the method that, after the connection of an associated coupling head of the trailer vehicle to the "reservoir" coupling head of the tractor vehicle, the feed of reservoir compressed air to the "reservoir" coupling head of the tractor vehicle is enabled and the latter is charged again with reservoir compressed air.

By virtue of the fact that the "reservoir" coupling head of the tractor vehicle is shut off and ventilated before the connection of the "reservoir" coupling heads of the tractor vehicle and of the trailer vehicle, the "reservoir" coupling head of the trailer vehicle can be connected to the "reservoir" coupling head of the tractor vehicle without the escape of compressed air and thus without disturbing noises and compressed-air forces. The connection of the coupling head of the trailer vehicle to the coupling head of the tractor vehicle can thus be carried out much more easily and comfortably than has previously been the case in practice.

In a refinement of this highlighted basic approach according to the present disclosure, use is made of a method for controlling a valve arrangement of a tractor vehicle, via which a pneumatic brake system of a trailer vehicle can be controlled. This valve arrangement of the tractor vehicle has an electronically or mechanically controllable trailer control valve via which reservoir compressed air that is introduced can be conducted via a reservoir pressure output to a "reservoir" coupling head of the tractor vehicle, and via which a brake control pressure can be set and conducted via a brake control output to a "brake" coupling head of the tractor vehicle. Furthermore, an electronically controllable parking brake module is provided, via which an inverted control input of the trailer control valve can be ventilated for the actuation of the wheel brakes of the trailer vehicle in a parking brake function. The parking brake module has at least one solenoid switching valve which acts as parking brake valve.

For the comfortable pneumatic connection of tractor vehicle and trailer vehicle, it is provided that, during the engagement of the parking brake of the tractor vehicle corresponding to an actuation state PB=1, the "reservoir" coupling head of the tractor vehicle is ventilated and the "brake" coupling head of the tractor vehicle is kept in a ventilated state.

By virtue of the fact that, during the engagement of the parking brake of the tractor vehicle, the "reservoir" coupling head of the tractor vehicle is ventilated and the "brake" coupling head of the tractor vehicle is kept in a ventilated state, the associated coupling heads of the trailer vehicle can be connected to the coupling heads of the tractor vehicle without the escape of compressed air and thus without disturbing noises and compressed-air forces. The connection of the coupling heads of the trailer vehicle to the coupling heads of the tractor vehicle can thus be carried out much more easily and comfortably than has previously been the case in practice.

In a first method variant of this refinement, it is provided that the "reservoir" coupling head and the "brake" coupling head of the tractor vehicle are kept in a ventilated state until such time as the parking brake of the tractor vehicle is released again (actuation state PB=0). This may however be associated with the disadvantage that the storage tanks of the trailer vehicle are insufficiently filled when the vehicle combination commences travel.

According to a second method variant of the abovementioned refinement, with which the disadvantage just mentioned is avoided, it is therefore provided that the "reservoir" coupling head and the "brake" coupling head of the tractor vehicle are kept in a ventilated state over a predetermined time period which is dimensioned such that, within this time period, a driver is comfortably capable of exiting the driver's cab of the tractor vehicle, seeking out the coupling region and connecting the coupling heads of the trailer vehicle to the coupling heads of the tractor vehicle.

According to a third method variant of the stated refinement, with which the stated disadvantage is likewise avoided, it is provided that, during the ventilation of "reservoir" coupling head and "brake" coupling head of the tractor vehicle, pressure pulses are introduced in a specified timing cycle into the reservoir pressure line leading to the "reservoir" coupling head, that the pressure gradient in the reservoir pressure line is measured by sensor means, that the two coupling heads of the tractor vehicle are kept in a ventilated state if a steep pressure gradient is present, and that the ventilation of the two coupling heads is ended if a shallow pressure gradient is present.

Here, it is assumed that the connection of the reservoir pressure line of the trailer vehicle to the "reservoir" coupling head of the tractor vehicle is performed, as is conventional, immediately after the connection of the brake control line to the "brake" coupling head. A steep pressure gradient is present if the reservoir line of the trailer vehicle has not yet been connected to the "reservoir" coupling head of the tractor vehicle and the volume of the respective reservoir pressure line is thus small. By contrast, a shallow pressure gradient is present if the reservoir line of the trailer vehicle has already been connected to the "reservoir" coupling head of the tractor vehicle and the volume of the respective reservoir pressure line is thus large. Since, owing to the ventilated "brake" coupling head, the wheel brakes of the trailer vehicle may be briefly released as a result of the pulsed aeration of the "reservoir" coupling head, it may however occur that the vehicle combination briefly starts to roll if the parking brakes of the tractor vehicle are not capable of preventing this.

To avoid this latter disadvantage, it is provided in a fourth method variant of the stated refinement that, during the ventilation of "reservoir" coupling head and "brake" coupling head of the tractor vehicle, pressure pulses are introduced in a specified timing cycle into the brake control line leading to the "brake" coupling head of the tractor vehicle, that the pressure gradient in the brake control line is measured by sensor means, that the two coupling heads of the tractor vehicle are kept in a ventilated state if a steep pressure gradient is present, and that the ventilation of the two coupling heads of the tractor vehicle is ended if a shallow pressure gradient is present.

Here, it is assumed that the connection of the brake control line of the trailer vehicle to the "brake" coupling head of the tractor vehicle is performed, as is conventional, immediately before the connection of the reservoir pressure line to the "reservoir" coupling head of the tractor vehicle. A steep pressure gradient is present if the brake control line of the trailer vehicle has not yet been connected to the "brake" coupling head of the tractor vehicle and the volume of the respective brake control line is thus small. By contrast, a shallow pressure gradient is present if the brake control line of the trailer vehicle has already been connected to the "brake" coupling head of the tractor vehicle and the volume of the respective brake control line is thus large.

A different response behavior of the shut-off and ventilation valves or of the parking brake module and the trailer control valves can have the effect that, during the engagement of the parking brake of the tractor vehicle, the "reservoir" coupling head of the tractor vehicle is initially still pressurized, whereas the "brake" coupling head of the tractor vehicle has already been ventilated, or is kept in a ventilated state. As a result, the wheel brakes of the trailer vehicle may be briefly released, whereby the vehicle combination can start to move slightly if the braking action of the parking brakes of the tractor vehicle is not high enough to stop the entire vehicle combination. It is therefore advantageous that, in order to avoid a release of the wheel brakes of the tractor vehicle, firstly the "reservoir" coupling head of the tractor vehicle is ventilated, and the "brake" coupling head of the tractor vehicle is ventilated after a slight time delay, for example of one second, in relation thereto, or is kept in a ventilated state.

The ventilation of the "reservoir" and "brake" coupling heads of the tractor vehicle is performed preferably by means of in each case one shut-off and ventilation valve according to the described embodiments of the valve arrangement according to the present disclosure, which is arranged in the brake control line between the brake control output and the "brake" coupling head of the tractor vehicle and/or in the reservoir pressure line between the reservoir pressure output and the "reservoir" coupling head of the tractor vehicle, and/or by means of a parking brake module according to the respective embodiment of the valve arrangement according to the present disclosure.

The ventilation of the "reservoir" coupling head and of the "brake" coupling head of the tractor vehicle may also be triggered indirectly by means of a manually actuatable electrical switch which is arranged preferably on the rear end of the tractor vehicle and which is connected to the electronic control unit via a signal line. By means of the signalling of the switch actuation, an electrical energization of at least one of the two shut-off and ventilation valves, and thus a ventilation of the respectively associated coupling head, is triggered in the control unit. The driver of the tractor vehicle can consequently connect the reservoir line and the brake control line of a trailer vehicle to the ventilated and shut-off "reservoir" and "brake" coupling heads of the tractor vehicle in a comfortable and quiet manner, as described.

The measurement of the pressure gradient in the respective line is performed by means of a pneumatic pressure sensor according to the described embodiments of the valve arrangement according to the present disclosure, which pressure sensor is connected to the brake control line between the shut-off and ventilation valve located there and the "brake" coupling head of the tractor vehicle or to the reservoir pressure line between the shut-off and ventilation valve located there and the "reservoir" coupling head of the tractor vehicle, or by means of a pneumatic pressure sensor which is connected, within the trailer control valve, to the brake control line leading to the "brake" coupling head of the tractor vehicle.

To further illustrate the present disclosure, drawings showing multiple embodiments are appended to the description.

BRIEF DESCRIPTION OF THE DRAWINGS

In the drawings,

FIG. 2a shows a vehicle combination composed of a tractor vehicle and a trailer vehicle, wherein the tractor vehicle has a "reservoir" coupling head and a "brake" coupling head for the supply of pressure medium to the trailer vehicle;

FIG. 2b shows the profile with respect to time of the reservoir pressure prevailing at the "reservoir" coupling head according to the present disclosure during the coupling of the trailer vehicle;

FIG. 2c shows the profile with respect to time of the brake control pressure prevailing at the "brake" coupling head according to the present disclosure during the coupling of the trailer vehicle;

FIG. 2d shows the profile with respect to time of the switching state of the parking brake of a tractor vehicle according to the present disclosure during the coupling of a trailer vehicle;

FIG. 3a shows the profile with respect to time of the reservoir pressure prevailing at the "reservoir" coupling head according to a first method variant;

FIG. 3b shows the profile with respect to time of the brake control pressure prevailing at the "brake" coupling head according to the first method variant;

FIG. 3c shows the profile with respect to time of the switching state of the parking brake of a tractor vehicle according to the first method variant;

FIG. 4a shows the profile with respect to time of the reservoir pressure prevailing at the "reservoir" coupling head according to a second method variant;

FIG. 4b shows the profile with respect to time of the brake control pressure prevailing at the "brake" coupling head according to the second method variant;

FIG. 4c shows the profile with respect to time of the switching state of the parking brake of a tractor vehicle according to the second method variant;

FIG. 5a shows the profile with respect to time of the reservoir pressure prevailing at the "reservoir" coupling head according to a third method variant;

FIG. 5b shows the profile with respect to time of the switching state of a shut-off and ventilation valve, which is arranged in a reservoir pressure line, according to the third method variant;

FIG. 5c shows the profile with respect to time of the switching state of the parking brake of a tractor vehicle according to the third method variant;

FIG. 6a shows the profile with respect to time of the brake control pressure prevailing at the "brake" coupling head according to a fourth method variant;

FIG. 6b shows the profile with respect to time of the switching state of a shut-off and ventilation valve, which is arranged in a brake control line, according to the fourth method variant;

FIG. 6c shows the profile with respect to time of the switching state of the parking brake of a tractor vehicle according to the fourth method variant;

DETAILED DESCRIPTION OF THE DRAWINGS

Figure 1A:
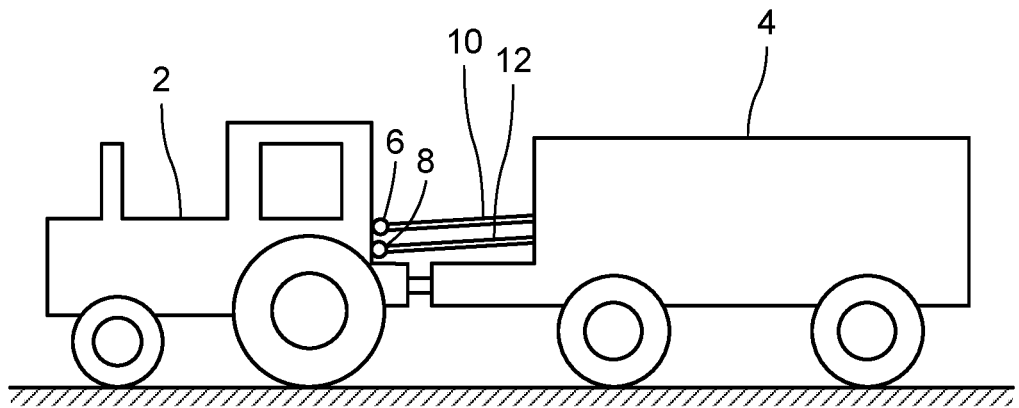
FIG. 1a shows a vehicle combination composed of a tractor vehicle and a trailer vehicle, wherein the tractor vehicle has a "reservoir" coupling head and a "brake" coupling head for the supply of pressure medium to the trailer vehicle.
Figure 1B:
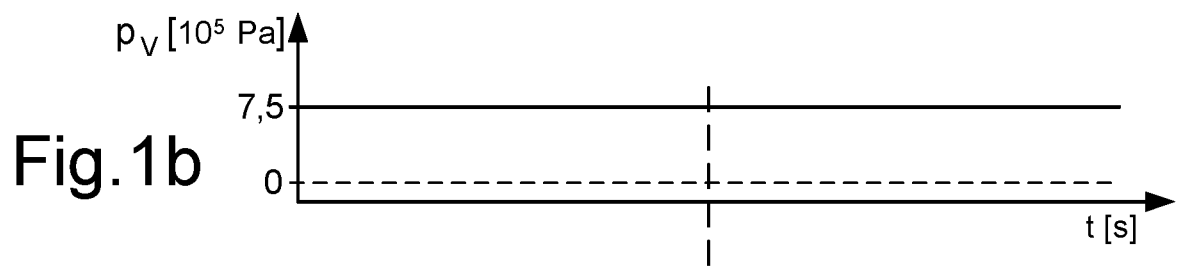
FIG. 1b shows the profile with respect to time of the reservoir pressure prevailing at the "reservoir" coupling head according to the prior art during the coupling of the trailer vehicle.
Figure 1C:
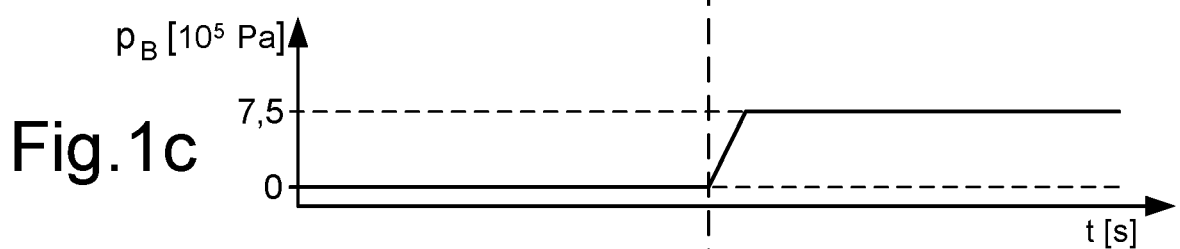
FIG. 1c shows the profile with respect to time of the brake control pressure prevailing at the "brake" coupling head according to the prior art during the coupling of the trailer vehicle.
Figure 1D:
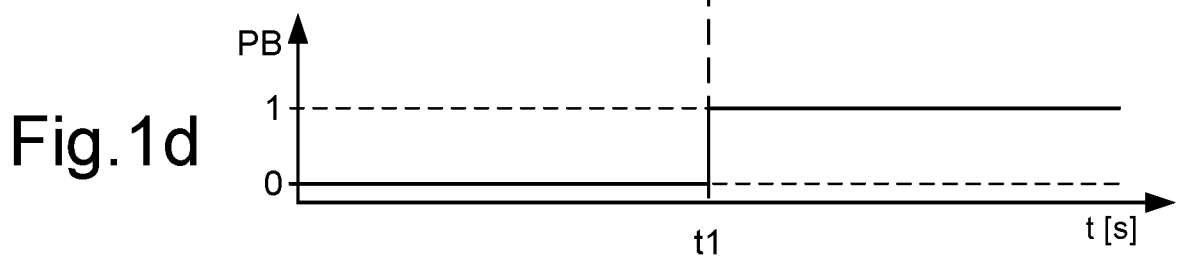
FIG. 1d shows the profile with respect to time of the switching state of the parking brake of a tractor vehicle according to the prior art during the coupling of the trailer vehicle.

FIG. 1a accordingly shows a known vehicle combination which is composed of a tractor vehicle 2 and a trailer vehicle 4 coupled thereto. For the control of the brakes of the trailer vehicle 4, the two-line compressed-air brake system thereof is connected via two flexible compressed-air lines to the tractor vehicle 2. The first compressed-air line is a reservoir pressure line 10, which is connected to a "reservoir" coupling head (red) 6 of the tractor vehicle 2. The second compressed-air line is a brake control line 12, which is connected to the "brake" coupling head (yellow) 8. FIGS. 1b to 1d illustrate the prior art and show, in sequence, the profile with respect to time of the reservoir pressure pV at the "reservoir" coupling head (red) 6, the profile with respect to time of the brake control pressure pB at the "brake" coupling head (yellow) 8, and the profile with respect to time of the actuation state of the parking brake PB of the tractor vehicle 2 in accordance with present practice, wherein, in FIG. 1d, the value 0 denotes the actuation state "brake disengaged", and the value 1 denotes "brake engaged". The expression "brake in open position" may also be used synonymously for the expression "brake disengaged" that is used, and the expression "brake in closed position" may also be used in place of the expression "brake engaged".

As illustrated in FIG. 1b, it is the case in the prior art that, before and during the pneumatic coupling of the trailer vehicle 4 to the tractor vehicle 2, the reservoir pressure pV of in this case by way of example 7.5×105 Pa permanently prevails at the "reservoir" coupling head 6. By contrast, as per FIG. 1c, when the service brake of the tractor vehicle 2 is released, the "brake" coupling head 8 is ventilated before the engagement of the parking brake PB in the tractor vehicle 2 (pB=0 Pa). With the engagement of the parking brake PB in the tractor vehicle 2 at the point in time t1, the "brake" coupling head 8 is aerated and, shortly thereafter, is at a brake control pressure (pB=7.5×105 Pa) corresponding to the reservoir pressure. The coupling of the reservoir pressure line 10 and of the brake control line 12 of the trailer vehicle 4 to the associated coupling heads 6, 8 of the tractor vehicle 2, which takes place after the mechanical coupling of the trailer vehicle 4 to the tractor vehicle 2 and the engagement of the parking brake PB in the tractor vehicle 2, must therefore be performed when the coupling heads 6, 8 are pressurized, which is relatively uncomfortable and difficult owing to the compressed air that escapes in the process and the acting air pressure forces.

FIG. 2a shows the same vehicle combination as in FIG. 1a, on which the method according to the present disclosure can also be implemented to great advantage, as described below. In this regard, FIG. 2b shows the pressure profile with respect to time of the reservoir pressure pV prevailing at the "reservoir" coupling head (red) 6, FIG. 2c shows the pressure profile with respect to time of the brake control pressure pB prevailing at the "brake" coupling head (yellow) 8 of the tractor vehicle 2, and FIG. 2d shows the actuation state of the parking brake PB of the tractor vehicle 2 (0="brake disengaged"; 1="brake engaged") according to the present disclosure. The "reservoir" coupling head 6 is initially at the reservoir pressure pV=7.5×105 Pa, but is ventilated upon the engagement of the parking brake PB in the tractor vehicle 2, which takes place at the point in time t1. Furthermore, the "brake" coupling head 8 is not aerated after the engagement of the parking brake PB in the tractor vehicle 2, but rather continues to be kept in a ventilated state (pB=0 Pa). The coupling of the reservoir and brake control line 10, 12 of the trailer vehicle 4 to the associated coupling heads 6, 8 of the tractor vehicle 2, which takes place after the mechanical coupling of the trailer vehicle 4 to the tractor vehicle 2 and the engagement of the parking brake PB in the tractor vehicle 2, can therefore, as is evident, be performed when the coupling heads 6, 8 are unpressurized, which is much more comfortable and easier than in the case of previous practice.

In other words, it is provided according to the present disclosure that, during the coupling of a trailer vehicle 4, which is equipped with a two-line compressed-air brake system, that is to say with a reservoir pressure line 10 and a brake control line 12, to a tractor vehicle 2, during the engagement of the parking brake in the tractor vehicle 2, the "reservoir" coupling head 6 located there is ventilated and the "brake" coupling head 8 located there is kept in a ventilated state. In this way, the coupling heads of the trailer vehicle 4 can be connected to the coupling heads 6, 8 of the tractor vehicle 2 without the escape of compressed air and thus without disturbing noises and compressed-air forces, whereby the connection of the coupling heads of the trailer vehicle 4 is also considerably simpler and more comfortable than was previously the case.

Below, four method variants of the method according to the present disclosure for controlling a valve arrangement of a tractor vehicle 2 will firstly be discussed, with regard to the control of a pneumatic brake system of a trailer vehicle 4 during the coupling of the trailer vehicle 4 to the tractor vehicle 2, on the basis of pressure profiles of the reservoir pressure pV prevailing at the "reservoir" coupling head (red) 6 and of the brake control pressure pB prevailing at the "brake" coupling head (yellow) 8 of the tractor vehicle 2 and the actuation state of the parking brake of the tractor vehicle 2.

As illustrated in FIGS. 3a to 3c, it is provided in a first method variant that, starting at the engagement of the parking brake (PB=1) at the point in time t1 until the disengagement or release of the parking brake (PB=0) at the point in time t2, the "reservoir" and "brake" coupling heads 6, 8 are ventilated or are kept in a ventilated state. Upon the engagement of the parking brake in the tractor vehicle 2 at the point in time t1, the "reservoir" coupling head 6 is accordingly ventilated, and the "brake" coupling head 8, which would normally then be aerated, remains ventilated. The wheel brakes of the trailer vehicle are nevertheless engaged upon the connection of the reservoir line 10 and of the brake control line 12 of the trailer vehicle 4 to the coupling heads 6, 8 of the tractor vehicle 2, because the wheel brakes are actuated by means of a trailer brake valve owing to the unpressurized reservoir line 10 in the breakaway safeguard function thereof.

The unpressurized state of the two coupling heads 6, 8 is maintained until such time as the parking brake in the tractor vehicle is released (PB=0), which occurs at the point in time t2. The "reservoir" coupling head 6 of the tractor vehicle 2, and thus also the reservoir line 10 of the trailer vehicle 4, are then aerated with the reservoir pressure of pV=7.5×105 Pa. By contrast, the "brake" coupling head 8 of the tractor vehicle 2 and thus also the brake control line 12 of the trailer vehicle 4 remain ventilated or unpressurized, because the parking brake has now been disengaged again.

In a second method variant, which will be discussed below with the aid of FIGS. 4a to 4c, it is provided that the "reservoir" and "brake" coupling heads 6, 8 are kept in a ventilated state over a predetermined time period ΔtZ. This time period ΔtZ is dimensioned such that, within this time period, a driver is comfortably capable of exiting the driver's cab of the tractor vehicle 2, seeking out the coupling region of the tractor vehicle 2 and connecting the coupling heads of the trailer vehicle 4 to the coupling heads 6, 8 of the tractor vehicle 2. After the expiry of this time period ΔtZ at the point in time tZ, both the "reservoir" coupling head 6 and the "brake" coupling head 8 are aerated with the reservoir pressure, such that the wheel brakes of the trailer vehicle 4 remain engaged despite the now pressurized reservoir pressure line 10. Only upon the disengagement of the parking brake at the point in time t2 are the "brake" coupling head 8 of the tractor vehicle 2 and thus also the brake control line 12 of the trailer vehicle 4 ventilated, whereby the wheel brakes of the trailer vehicle 4 are released.

According to a third method variant, which will be discussed below with the aid of FIGS. 5a to 5c, it is provided that, during the ventilation of "reservoir" and "brake" coupling heads 6, 8, pressure pulses are introduced in a specified timing cycle ΔtT into the reservoir pressure line leading to the "reservoir" coupling head 6, that the pressure gradient in the reservoir pressure line is measured by sensor means, and that the two coupling heads 6, 8 are kept in a ventilated state if a steep pressure gradient is present, and that the ventilation of the coupling heads 6, 8 is ended if a shallow pressure gradient is present.

To illustrate this method variant, the diagram of FIG. 5a shows the pressure profile of the reservoir pressure pV prevailing at the "reservoir" coupling head 6 (red), the diagram of FIG. 5b shows the switching state of a shut-off and ventilation valve VA/E (0=non-actuated, 1=switched) arranged in the respective reservoir pressure line between a reservoir pressure output of a trailer control valve and the "reservoir" coupling head 6, and the diagram of FIG. 5c shows the actuation state of the parking brake PB of the tractor vehicle 2 (0=disengaged, 1=engaged), in each case versus the time t. By means of the non-actuated shut-off and ventilation valve VA/E, the "reservoir" coupling head 6 is connected to the reservoir pressure output of the trailer control valve. In the switched or actuated state of the shut-off and ventilation valve VA/E, the reservoir pressure output of the trailer control valve is shut off and the "reservoir" coupling head 6 is connected to a ventilation output, and is thus unpressurized.

At the point in time t1, the parking brake PB in the tractor vehicle is engaged (PB=1), leading to the switching of the shut-off and ventilation valve VA/E (VA/E=1), such that the "reservoir" coupling head 6 is ventilated. Proceeding from the point in time t3, by brief deactivation of the shut-off and ventilation valve VA/E at time intervals of ΔtT, a pressure pulse is repeatedly input into the reservoir pressure line, and the pressure gradient generated in the process is measured by sensor means. The pressure pulses introduced between the points in time t3 and t3', t4 and t4' and also t5 and t5' have a pulse duration ΔtI of approximately 1 second. The timing cycle ΔtT of the pressure pulses may for example be 10 seconds. The first two pressure pulses (between the points in time t3 and t3' and also t4 and t4') result in a steep pressure gradient, from which it can be concluded that a small line volume is present and thus that a connection of the reservoir pressure line 10 of the trailer vehicle 4 to the "reservoir" coupling head 6 of the tractor vehicle 2 has not yet occurred. The two coupling heads 6, 8 thus initially continue to be kept in a ventilated state.

At the later point in time tK, the reservoir pressure line 10 of the trailer vehicle 4 is connected to the "reservoir" coupling head 6, such that the subsequent third pressure pulse (between the points in time t5 and t5') gives rise to a shallower pressure gradient than previously, owing to the enlarged line volume. Therefore, the ventilation of the "reservoir" coupling head 6 is ended by way of the permanent deactivation of the shut-off and ventilation valve VA/E (VA/E=0), and the "brake" coupling head 8 is also aerated again, whereby a release of the wheel brakes of the trailer vehicle 4 is avoided. Here, it is assumed that the connection of the reservoir pressure line 10 of the trailer vehicle 4 to the "reservoir" coupling head 6 of the tractor vehicle 2 is performed, as is conventional, immediately after the connection of the brake control line 12 to the "brake" coupling head 8. The "brake" coupling head 8 is then ventilated again only when the parking brake PB in the tractor vehicle 2 is disengaged, which occurs at the point in time t2. Since, owing to the ventilated "brake" coupling head 8, the wheel brakes of the trailer vehicle 4 may be briefly released as a result of the pulsed aeration of the "reservoir" coupling head 6, it may occur that the vehicle combination 2, 4 briefly starts to roll if the parking brakes of the tractor vehicle 2 are too weak to prevent this.

In a fourth method variant, which will be discussed below on the basis of FIGS. 6a to 6c, the disadvantage just described does not arise. It is provided here that, during the ventilation of the "reservoir" and "brake" coupling heads 6, 8, pressure pulses are introduced in a specified timing cycle ΔtT into the brake control line leading to the "brake" coupling head 8, that the pressure gradient in the brake control line is measured by sensor means, that the coupling heads 6, 8 are kept in a ventilated state if a steep pressure gradient is present, and that the ventilation of the coupling heads 6, 8 is ended if a shallow pressure gradient is present.

To illustrate this method variant, FIG. 6a shows the pressure profile of the brake control pressure pB prevailing at the "brake" coupling head 8 (yellow), FIG. 6b shows the switching state of a shut-off and ventilation valve VA/E (0=non-actuated, 1=switched) arranged in the respective brake control line between a brake control output of a trailer control valve and the "brake" coupling head 8, and FIG. 6c shows the actuation state of the parking brake PB (0=disengaged, 1=engaged) of the tractor vehicle 2, in each case versus the time t. By means of the non-actuated shut-off and ventilation valve VA/E, the coupling head "brake" 8 is connected to the brake control output of the trailer control valve. In the switched state of the shut-off and ventilation valve VA/E, the brake control output of the trailer control valve is shut off, and the "brake" coupling head 8 is connected to a ventilation output and is thus unpressurized.

At the point in time t1, the parking brake PB in the tractor vehicle is engaged (PB=1), leading to the switching of the shut-off and ventilation valve VA/E (VA/E=1), such that the "brake" coupling head 8 continues to be kept in a ventilated state. Proceeding from the point in time t3, by brief deactivation of the shut-off and ventilation valve VA/E at time intervals of ΔtI, a pressure pulse is repeatedly input into the brake control line, and the pressure gradient generated in the process is measured by sensor means. The pressure pulses introduced between the points in time t3 and t3', t4 and t4' and also t5 and t5' have a pulse duration ΔtI of approximately 1 second. The timing cycle ΔtT of the pressure pulses may for example be 10 seconds. The first two pressure pulses (between the points in time t3 and t3' and also t4 and t4') result in a steep pressure gradient, from which it can be concluded that a small line volume is present and thus that a connection of the brake control line 12 of the trailer vehicle 4 to the "brake" coupling head 8 of the tractor vehicle 2 has not yet occurred. The two coupling heads 6, 8 thus initially continue to be kept in a ventilated state.

At the later point in time tK, the brake control line 12 of the trailer vehicle 4 is connected to the "brake" coupling head 8 of the tractor vehicle 2, such that the subsequent third pressure pulse (between the points in time t5 and t5') gives rise to a shallower pressure gradient than previously, owing to the enlarged line volume. Therefore, the ventilation of the "brake" coupling head 8 is ended by way of the permanent deactivation of the shut-off and ventilation valve VA/E (VA/E=1), and the "reservoir" coupling head 6 is also aerated again, whereby a release of the wheel brakes of the trailer vehicle 4 is avoided. Here, it is assumed that the connection of the brake control line 12 of the trailer vehicle 4 to the "brake" coupling head 8 of the tractor vehicle 2 is performed, as is conventional, immediately after the connection of the reservoir pressure line 10 to the "reservoir" coupling head 6. The "brake" coupling head 8 is then ventilated again only when the parking brake PB in the tractor vehicle 2 is disengaged, which occurs at the point in time t2.

Six embodiments of valve arrangements 14.1, 14.2, 14.3, 14.3', 14.4, 14.5, 14.6 according to the present disclosure of a tractor vehicle 2 for controlling a pneumatic brake system of a trailer vehicle 4 will be discussed below on the basis of schematic FIGS. These valve arrangements are refinements according to the present disclosure of a valve arrangement 14, shown in FIG. 14, of a hydraulically braked tractor vehicle, which is known from the WABCO document 815 020 082 3 "Druckluftbremsanlage Land—and Forstwirtschaft/Produktkatalog" [Compressed-air brake system for agriculture and forestry/product catalogue], page 105. The first embodiment of the valve arrangement 14.1 according to the present disclosure as per FIG. 7 allows direct manual ventilation of the two coupling heads 6, 8 for the coupling of the reservoir line 10 and of the brake control line 12 of a trailer vehicle 4 by a driver of the tractor vehicle. The further four embodiments of the valve arrangement 14.2, 14.3, 14.3', 14.4 according to the present disclosure allow an automated ventilation of the coupling heads 6, 8 for the coupling of the reservoir line 10 and of the brake control line 12 of a trailer vehicle 4 correspondingly to the method variants described further above.

Figure 14:
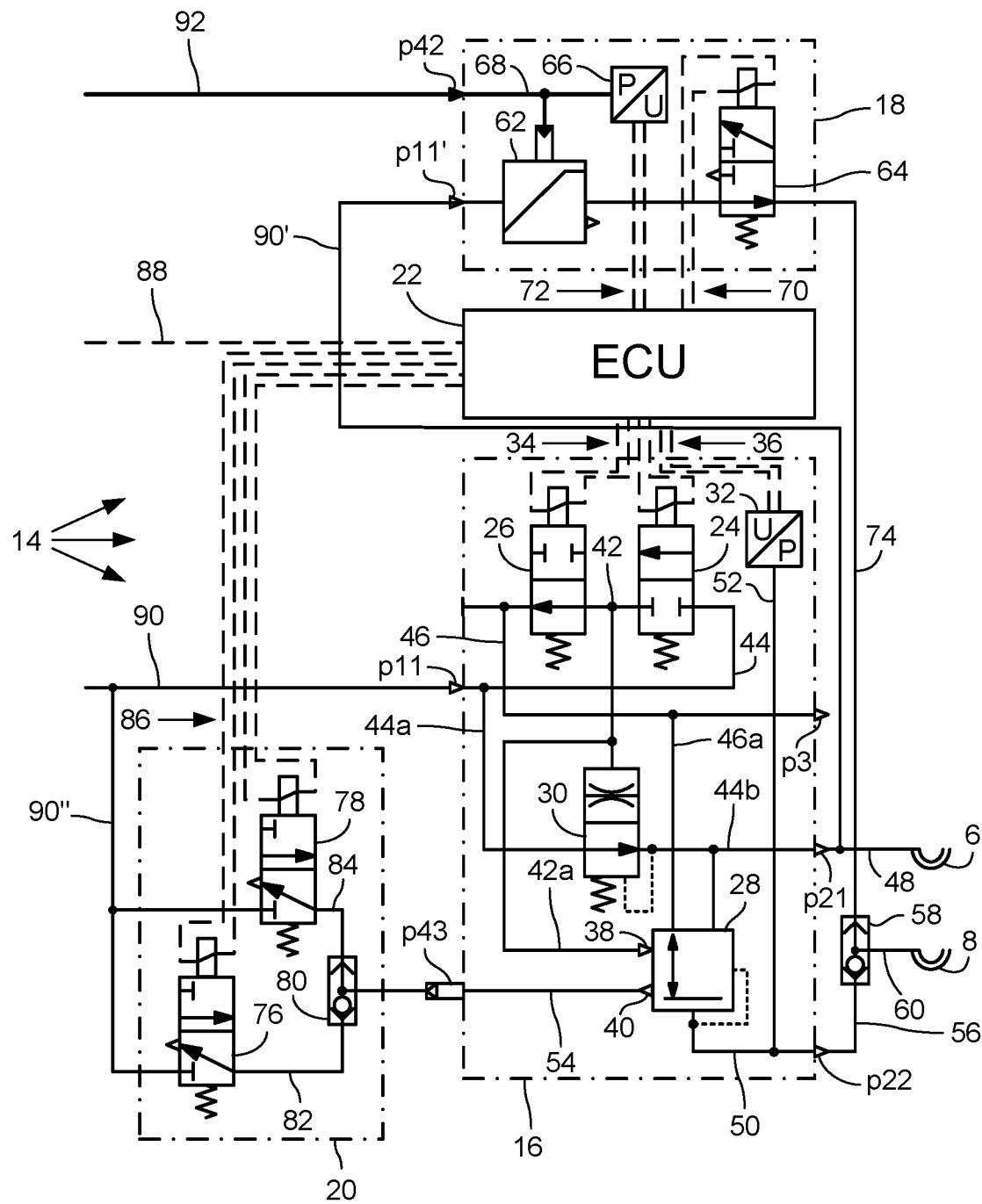
FIG. 14 shows a known valve arrangement of a tractor vehicle for controlling a pneumatic brake system of a trailer vehicle in a schematic diagram.

The known valve arrangement 14 shown in FIG. 14 has an electronically controlled trailer control valve 16, a hydraulically controlled backup valve 18, an electronically controlled parking brake module 20 and an electronic control unit (ECU) 22. The parking brake module 20 is a structural or else merely graphical close combination of multiple components which interact in terms of circuitry, and will be described in more detail below.

The trailer control valve 16 has a pneumatically controllable relay valve 28, a pneumatically controllable breakaway valve 30, an inlet valve 24, an outlet valve 26 and a pneumatic pressure sensor 32. The inlet valve 24 and the outlet valve 26 are each in the form of a 2/2 directional solenoid switching valve, in particular in the form of a cycle valve, via which the pneumatic control pressure prevailing at a control input 38 of the relay valve 28 is settable. The switching magnets of the inlet valve 24 and of the outlet valve 26 are connected via electrical control lines 34, and the pressure sensor 32 is connected via an electrical sensor line 36, to the electronic control unit 22.

The inlet valve 24 is closed when electrically deenergized and is open when electrically energized. The outlet valve 26 is open when electrically deenergized and is closed when electrically energized. A control pressure line 42 that leads from the output of the inlet valve 24 and from the input of the outlet valve 26 to a control input of the breakaway valve 30 and via a line branch 42a to a direct first control input 38 of the relay valve 28 is connectable by means of the inlet valve 24 to an internal reservoir pressure line 44 and by means of the outlet valve 26 to a ventilation line 46 that leads to a ventilation output p3. The internal reservoir pressure line 44 is connected to a reservoir pressure input p11 of the trailer control valve 16.

In the installed state of the trailer control valve 16, an external reservoir pressure line 90 of a pneumatic compressed-air supply installation of the tractor vehicle 2 is connected to the reservoir pressure input p11, which external reservoir pressure line is pressurized with a reservoir pressure of approximately 7.5×105 Pa when the drive engine of the tractor vehicle 2 is running. A line section 44a which branches off from the reservoir pressure line 44 is led by the breakaway valve 30 and an output-side line section 44b to a reservoir pressure output p21 of the trailer control valve 16. A "reservoir" coupling head (red) 6 is connected to the reservoir pressure output p21 via an external reservoir pressure line 48.

A reservoir pressure input of the relay valve 28 is connected via the branching line section 44a and the output-side line section 44b to the internal reservoir pressure line 44. A ventilation output of the relay valve 28 is connected via a connection line 46a to the ventilation line 46 leading to the ventilation output p3. A brake control output of the relay valve 28 is led via an output-side brake control line 50 to a brake control output p22 of the trailer control valve 16. A brake control line 56 connected to the brake control output p22 is led to a first input of a shuttle valve 58, to the output of which a "brake" coupling head (yellow) 8 is connected via an external brake control line 60. The trailer-control-valve-side pressure sensor 32 is connected via a sensor pressure line 52 to the output-side brake control line 50. A further internal control pressure line 54 is arranged between an inverted control input p43 of the trailer control valve 16 and an inverted second control input 40 of the relay valve 28.

The backup valve 18 has a hydraulically controllable relay valve 62, an electronically controllable redundancy valve 64 and a hydraulic pressure sensor 66. A control input of the backup-valve-side relay valve 62 is connected via an internal control pressure line 68 to a hydraulic control pressure input p42 of the backup valve 18. In the installed state of the backup valve 18, the control pressure input p42 of the backup valve 18 is connected via a connection line 92 to a brake line of a hydraulic brake circuit of the tractor vehicle 2. The backup-valve-side pressure sensor 66 is also connected to the internal control pressure line 68 of the backup valve 18. A reservoir pressure input (not designated in any more detail) of the backup-valve-side relay valve 62 is connected via a reservoir pressure input p11' of the backup valve 18 and a connection line 90' to the external reservoir pressure line 48 that leads to the "reservoir" coupling head (red) 6. A brake control output of the relay valve 62 of the backup valve 18 is connectable by means of the redundancy valve 64 and an external brake control line 74 to a second input of the shuttle valve 58. When the reservoir pressure input p11' is pressurized, a brake control pressure is output in the relay valve 62 in a manner dependent on the brake pressure prevailing at the brake pressure input p42, which brake control pressure, when the redundancy valve 64 is open, is conducted via the external brake control line 74 to the shuttle valve 58. The shuttle valve 58 conducts the respectively higher brake control pressure from the brake control line 56 of the trailer control valve 16 or from the brake control line 74 of the backup valve 18 via the brake control line 60 to the "brake" coupling head 8.

The redundancy valve 64 is in the form of a 3/2 directional solenoid switching valve, the output of which is connected via the external brake control line 74 to the second input of the shuttle valve 58. In the electrically deenergized state, the redundancy valve 64 is situated in the open position shown in FIG. 14, in which the external brake control line 74 is connected to the brake control output of the relay valve 62. In the electrically energized state, the redundancy valve 64 is switched from the open position shown in FIG. 14 into its shut-off position, in which the brake control output of the relay valve 62 is shut off and the external brake control line 74 is connected to a ventilation output of the redundancy valve 64 and is thus unpressurized. The switching magnet of the redundancy valve 64 is connected via electrical control lines 70, and the pressure sensor 66 is connected via electrical sensor lines 72, to the electronic control unit 22.

The parking brake module 20 serves for the control of the trailer control valve 16 at the inverted control pressure input p43 for the actuation of the wheel brakes of a coupled trailer vehicle 4 in a parking brake or auxiliary brake function. In this embodiment, the parking brake module 20 comprises two parking brake valves 76, 78, which are connected in parallel, and a parking-brake-module-side shuttle valve 80, which is connected downstream of the output side of the parking brake valves. In the installed state of the parking brake module 20, the output of the shuttle valve 80 is connected to the inverted control pressure input p43 of the trailer control valve 16.

The two parking brake valves 76, 78 are designed as 3/2 directional solenoid switching valves, the switching magnets of which are, in the installed state of the parking brake module 20, connected via electrical control lines 86 to the electronic control unit 22. The electronic control unit 22 is also connected via a data bus 88, which is conventionally a CAN bus, to further electronic control units, sensors and switches of the tractor vehicle 2 and of a coupled trailer vehicle 4. By means of the two parking brake valves 76, 78, in each case one brake control line 82, 84 connected to one of the inputs of the shuttle valve 80 is selectively connectable to a branch of a line section 90", which branches off from the external reservoir pressure line 90, or to a ventilation output. The parking-brake-module-side shuttle valve 80 conducts the respectively higher brake control pressure from the brake control line 82 of the first parking brake valve 76 or from the brake control line 84 of the second parking brake valve 78 via the inverted brake control pressure input p43 of the trailer control valve 16, and the internal brake control line 54 located there, to the inverted control input 40 of the relay valve 28. Here, one parking brake valve, for example the first parking brake valve 76, serves as a main parking brake valve, and the second parking brake valve 78 serves as a redundancy parking brake valve, which takes effect in place of the main parking brake valve in the event of a fault. The pressures respectively conducted by the two parking brake valves 76, 78 are identical.

In the electrically deenergized state of the two parking brake valves 76, 78, the associated brake control lines 82, 84 and thus the inverted control input 40 of the relay valve 28 are switched into an unpressurized state. In this way, in the relay valve 28 of the trailer control valve 16, a maximum brake control pressure is output, which is conducted via the internal brake control line 50, the brake control output p22, the brake control line 56, the first shuttle valve 58 and the external brake control line 60 to the "brake" coupling head (yellow) 8. In this way, in the presence of a coupled trailer vehicle 4, the wheel brake cylinder thereof is charged with a maximum brake pressure by means of the trailer brake valve located there, whereby the wheel brakes located there are engaged in the parking brake or auxiliary brake function.

In the event of an actuation, that is to say switching, of one of the two parking brake valves 76, 78, the respective brake control line 82; 84 and thus the inverted control input 40 of the relay valve 28 is charged with the reservoir pressure from the line section 90" of the external reservoir pressure line 90. In this way, in the presence of a coupled trailer vehicle 4, the wheel brake cylinder thereof is ventilated by means of the trailer brake valve located there, whereby the wheel brakes located there are released in the parking brake or auxiliary brake function. During normal driving operation of the tractor vehicle, one of the two parking brake valves 76; 78 is electrically energized and thus switched, such that the wheel brakes of a coupled trailer vehicle 4 are then released. The second parking brake valve of the two parking brake valves 76; 78 remains in a deactivated position, and is, as mentioned, activated only in the event of a fault. For redundancy reasons, the electronic control unit 22 has separate switching units for the independent switching actuation of the parking brake valves 76, 78, which are designed such that the respective switching state of the parking brake valves 76, 78 is automatically held and can only be actively changed.

During the normal operation of this known valve arrangement 14, the trailer control valve 16 is activated and the backup valve 18 is deactivated. Likewise, the parking brake module 20 is then deactivated until such time as no demand signal for the actuation of the wheel brakes of the trailer vehicle 4 in a parking brake or auxiliary brake function is present in the electronic control unit 22. For example, the activation of the trailer control valve 16 and the deactivation of the backup valve 18 are performed by means of the switching signal of an electrical switch which is arranged in or at a footbrake valve (not shown here) of the tractor vehicle 2 and which is closed after a short idle travel of a plunger which is axially displaceable by means of a brake pedal. In the presence of the corresponding switching signal that indicates an incipient braking operation, the backup valve 18 is deactivated by the switching of the redundancy valve 64 into its shut-off position.

In the trailer control valve 16, by means of corresponding actuation of the inlet and outlet valves 24, 26 located there, a control pressure prevailing at the direct control input 38 of the relay valve 28 is then output in a manner dependent on a present electronic brake value signal. The control pressure is converted in the relay valve 28 into a corresponding brake control pressure, which is conducted via the first shuttle valve 58 to the "brake" coupling head (yellow) 8. The corresponding brake value signal may be detected by means of a travel sensor which is arranged in or at the footbrake valve and which has a signal transducer with an actuation connection to the plunger located there. The brake value signal may however also be generated by means of a pressure sensor which is connected to a brake line of the tractor vehicle 2. In the present case, the function of the brake value sensor may therefore also be performed by the pressure sensor 66 which is arranged in the backup valve 18 and which is connected via the internal control pressure line 68 and the external connection line 92 to a hydraulic brake line of the tractor vehicle 2. Up to this point, the known prior art has been described with reference to FIG. 14.

Figure 7:
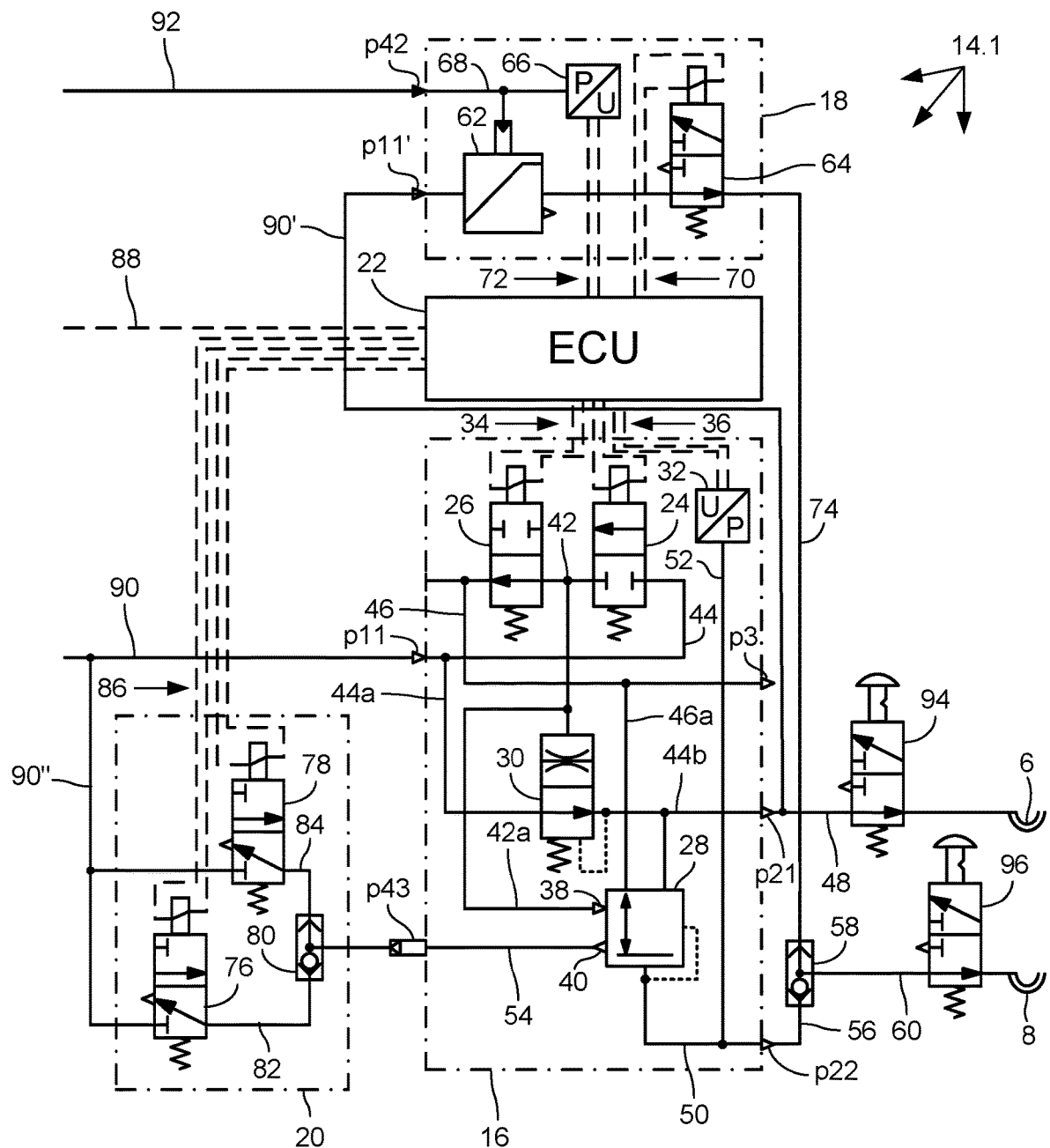
FIG. 7 shows a first embodiment of a valve arrangement according to the present disclosure of the tractor vehicle for controlling a pneumatic brake system of a trailer vehicle in a schematic diagram.

As per the first embodiment of a valve arrangement 14.1 shown in FIG. 7, in each case one manually actuatable shut-off and ventilation valve 94, 96 is arranged both in the reservoir pressure line 48 between the reservoir pressure output p21 of the trailer control valve 16 and the "reservoir" coupling head 6 and in the brake control line 60 between the output of the first shuttle valve 58 and the "brake" coupling head 8. It would however also be possible for the second shut-off and ventilation valve 96 to be arranged in the brake control line 56 between the brake control output p22 of the trailer control valve 16 and the first input of the first shuttle valve 58.

The two shut-off and ventilation valves 94, 96 are formed as 3/2 directional solenoid switching valves with an input connection connected to the output p21 of the trailer control valve 16 and to the output of the first shuttle valve 58 respectively, an output connection connected to the respective coupling head 6, 8, and a ventilation output. In the non-actuated state of the shut-off and ventilation valves 94, 96, the respective input connection is connected to the output connection p21, and the ventilation output is shut off. In the actuated state of the shut-off and ventilation valves 94, 96, the respective input connection is shut off and the output connection is connected to the ventilation output.

The two shut-off and ventilation valves 94, 96 are in the present case, by way of example, each manually switchable, and lockable in the switched position, by means of a pushbutton. The locking of the shut-off and ventilation valves may be releasable alternatively by means of a further actuation of the respective pushbutton or automatically after a predetermined holding time under the action of a respective valve-internal resetting spring.

If, in order to couple a trailer vehicle 4, a driver has reversed the tractor vehicle 2 and mechanically coupled the trailer vehicle 4 and engaged the parking brake, the driver can switch the coupling heads 6, 8 of the tractor vehicle 2 into an unpressurized state by way of the manual actuation of the pushbutton of the shut-off and ventilation valves 94, 96. In this way, the connection of the coupling heads of the trailer vehicle 4, which should be performed in the sequence of brake control line 12 before reservoir pressure line 10, is possible relatively easily and comfortably without disturbing noises and air forces. The coupling heads 6, 8 are thereafter aerated again by virtue of the shut-off and ventilation valves 94, 96 being reset into their initial position, which takes place by way of a further actuation of the pushbutton or automatically.

Figure 8:
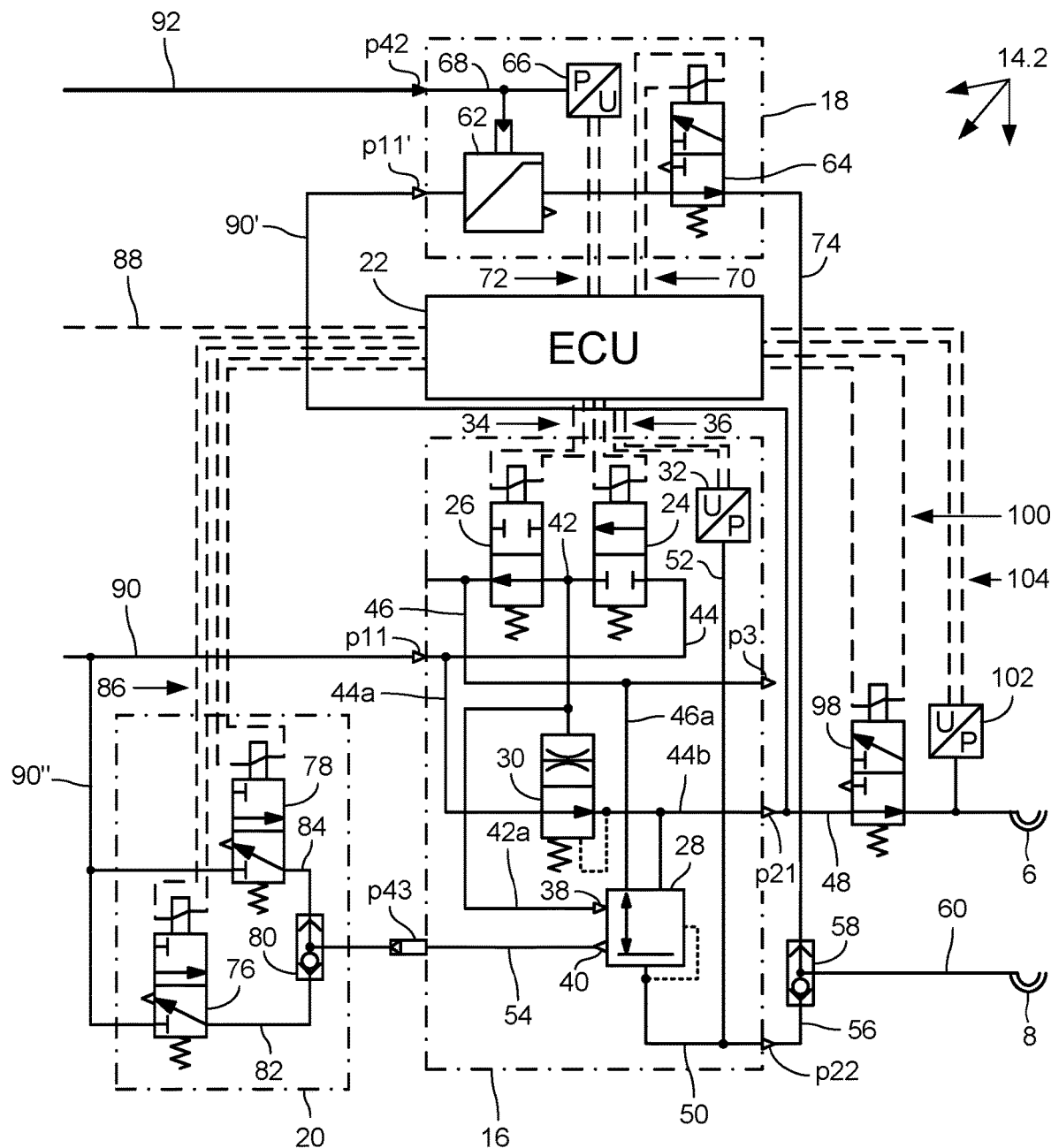
FIG. 8 shows a second embodiment of the valve arrangement according to the present disclosure in a schematic diagram.

In the second embodiment of the valve arrangement 14.2 according to the present disclosure shown in FIG. 8, an electrically actuatable shut-off and ventilation valve 98 is arranged only in the reservoir pressure line 48 between the reservoir pressure output p21 of the trailer control valve 16 and the "reservoir" coupling head 6, which shut-off and ventilation valve is connected via electrical control lines 100 to the electronic control unit 22. The shut-off and ventilation valve 98 is formed as a 3/2 directional solenoid switching valve with an input connection connected to the reservoir pressure output p21, an output connection connected to the "reservoir" coupling head 6, and a ventilation output. In the electrically deenergized state of the shut-off and ventilation valve 98, the input connection is connected to the output connection, and the ventilation output is shut off. In the electrically energized state of the shut-off and ventilation valve 98, the input connection is shut off and the output connection is connected to the ventilation output. Whereas the aeration and ventilation of the "reservoir" coupling head 6 are thus performed by corresponding actuation of the shut-off and ventilation valve 98, the aeration and ventilation of the "brake" coupling head 8 is provided by way of corresponding actuation of the trailer control valve 16 by the parking brake module 20.

In order to measure the reservoir pressure pV prevailing at the "reservoir" coupling head 6, a pneumatic pressure sensor 102 is connected to the reservoir pressure line 48 between the shut-off and ventilation valve 98 and the "reservoir" coupling head 6, which pneumatic pressure sensor is connected via electrical sensor lines 104 to the electronic control unit 22. By contrast, the brake control pressure pB prevailing at the "brake" coupling head may be measured by means of the pressure sensor 32 which is connected, within the trailer control valve 16, to the internal brake control line 50. For this purpose, as already mentioned, the pressure sensor 32 is connected via a sensor pressure line 52 to the brake control line 50.

When the parking brake in the tractor vehicle 2 is engaged, the coupling heads 6, 8 can, in this embodiment of the valve arrangement 14.2, be ventilated by means of corresponding actuation of the shut-off and ventilation valve 98 and of the parking brake module 20 by means of the electronic control unit 22, in accordance with one of the four method variants described above (see FIG. 3 to FIG. 6). Thus, in accordance with the first method variant, this is performed until such time as the parking brake of the tractor vehicle 2 is released again, or in accordance with the second method variant, this is performed until such time as a predetermined time period that is sufficient for the connection of the coupling head of the trailer vehicle 4 has expired, or in accordance with the third method variant, this is performed until such time as a pressure pulse repeatedly introduced into the reservoir pressure line 48 by brief opening of the shut-off and ventilation valve 98 results in a shallow pressure gradient, or in accordance with the fourth method variant, this is performed until such time as a pressure pulse repeatedly introduced into the brake control line 60 by means of a corresponding actuation of the parking brake module 20 by means of the trailer control valve 16 results in a shallow pressure gradient.

Figure 9:
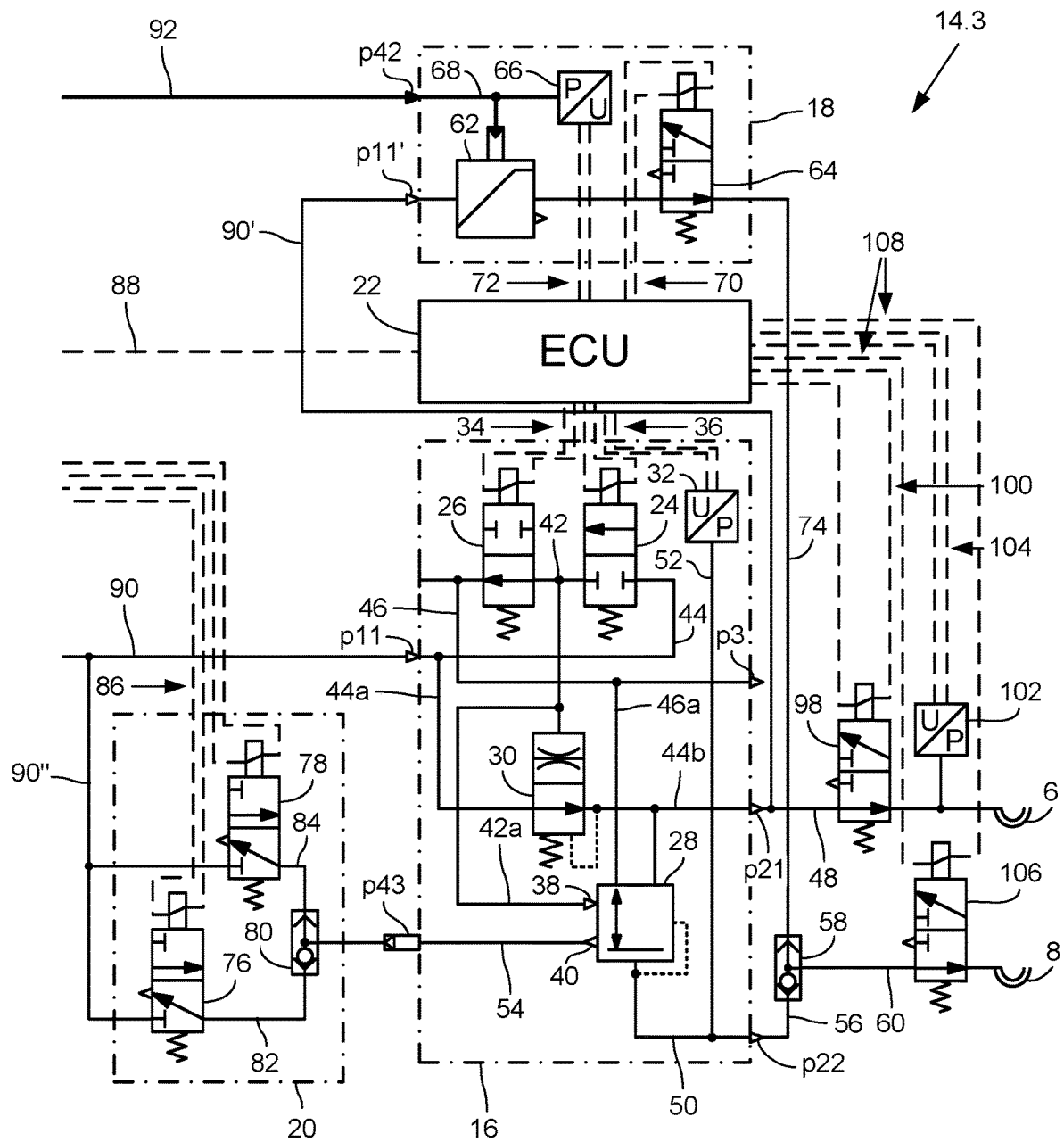
FIG. 9 shows a first variant of a third embodiment of the valve arrangement according to the present disclosure in a schematic diagram.

The first variant of the third embodiment of the valve arrangement 14.3 according to the present disclosure shown in FIG. 9 differs from the second embodiment of the valve arrangement 14.2 as per FIG. 8 in that the two parking brake valves 76, 78 of the parking brake module 20 are connected via the control lines 86 to a further electronic control unit which is not shown here. This may lead to a delayed response behavior in the case of an actuation of the parking brake module 20 by the electronic control unit 22 of the trailer control valve 16. Therefore, in this embodiment of the valve arrangement 14.3, an electrically actuatable shut-off and ventilation valve 106 is additionally arranged in the brake control line 60 between the output of the first shuttle valve 58 and the "brake" coupling head 8, which shut-off and ventilation valve is connected via electrical control lines 108 to the electronic control unit 22. It would however also be possible for the shut-off and ventilation valve 106 to be arranged in the brake control line 56 between the brake control output p22 of the trailer control valve 16 and the first input of the first shuttle valve 58.

The shut-off and ventilation valve 106 is formed as a 3/2 directional solenoid switching valve with an input connection connected to the output of the first shuttle valve 58, an output connection connected to the "brake" coupling head 8, and a ventilation output. In the electrically deenergized state of the shut-off and ventilation valve 106, the input connection is connected to the output connection, and the ventilation output is shut off. In the electrically energized state of the shut-off and ventilation valve 106, the input connection is shut off and the output connection is connected to the ventilation output. In this embodiment of the valve arrangement 14.3, the aeration and ventilation of the "brake" coupling head 8 is thus performed by means of corresponding actuation of the shut-off and ventilation valve 106 that is additionally integrated here.

When the parking brake in the tractor vehicle 2 is engaged, the two coupling heads 6, 8 can, in this variant of the third embodiment of the valve arrangement 14.3, be ventilated by means of corresponding actuation of the two shut-off and ventilation valves 98, 106 by means of the electronic control unit 22, in accordance with one of the three first method variants described above (see FIG. 3 to FIG. 5). Thus, in accordance with the first method variant, this is performed until such time as the parking brake of the tractor vehicle 2 is released again, or in accordance with the second method variant, this is performed until such time as a predetermined time period that is sufficient for the connection of the coupling head of the trailer vehicle 4 has expired, or in accordance with the third method variant, this is performed until such time as a pressure pulse repeatedly introduced into the reservoir pressure line 48 by brief opening of the shut-off and ventilation valve 98 results in a shallow pressure gradient.

Figure 10:
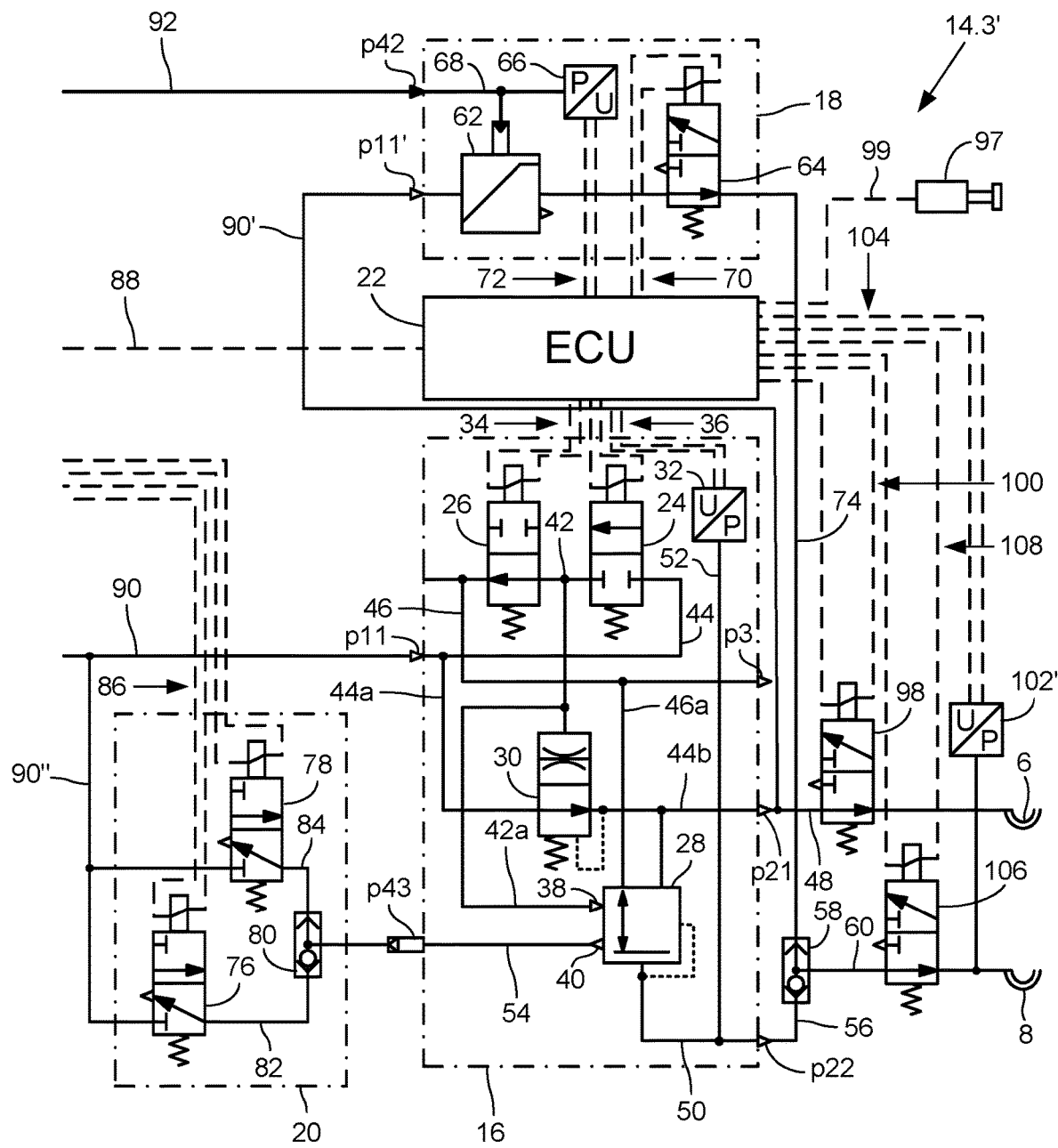
FIG. 10 shows a second variant of the third embodiment of the valve arrangement according to the present disclosure in a schematic diagram.

A second variant of the third embodiment of the valve arrangement 14.3' according to the present disclosure shown in FIG. 10 differs from the first variant of the third embodiment of the valve arrangement 14.3 as per FIG. 9 merely in that, instead of the pneumatic pressure sensor 102 connected to the reservoir pressure line 48, a pneumatic pressure sensor 102' is connected to the brake control line 60 between the shut-off and ventilation valve 106 and the "brake" coupling head 8.

When the parking brake in the tractor vehicle 2 is engaged, the two coupling heads 6, 8 can, in this variant of the third embodiment of the valve arrangement 14.3', be ventilated by means of corresponding actuation of the two shut-off and ventilation valves 98, 106 by means of the electronic control unit 22, in accordance with one of the two first method variants described above (see FIG. 3 and FIG. 4) and the fourth method variant described above (see FIG.

6). Thus, in accordance with the first method variant, this is performed until such time as the parking brake of the tractor vehicle 2 is released again, or in accordance with the second method variant, this is performed until such time as a predetermined time period that is sufficient for the connection of the coupling heads of the trailer vehicle 4 has expired, or in accordance with the fourth method variant, this is performed until such time as a pressure pulse repeatedly introduced into the brake control line 60 by brief opening of the shut-off and ventilation valve 106 results in a shallow pressure gradient.

Furthermore, in the case of the valve arrangement 14.3' as per FIG. 10, it is provided by way of example that the two shut-off and ventilation valves 98, 106 can if required be manually indirectly actuated by a person, that is to say generally by the driver of the tractor vehicle 2. For this purpose, on the rear end of the tractor vehicle 2, there is arranged a manually actuatable electrical switch 97, which is connected via a signal line 99 to the electronic control unit 22. The switch 97 and the electronic control unit 22 are designed such that an actuation of the switch 97 triggers an electrical energization of at least one of the two shut-off and ventilation valves 98, 106 and thus a shutting-off and a ventilation of the respectively associated coupling head 6, 8. Consequently, the reservoir line 10 and the brake control line 12 of a trailer vehicle 4 can, as described, be connected comfortably and quietly to the shut-off and ventilated coupling heads 6, 8 of the tractor vehicle 2.

Figure 11:
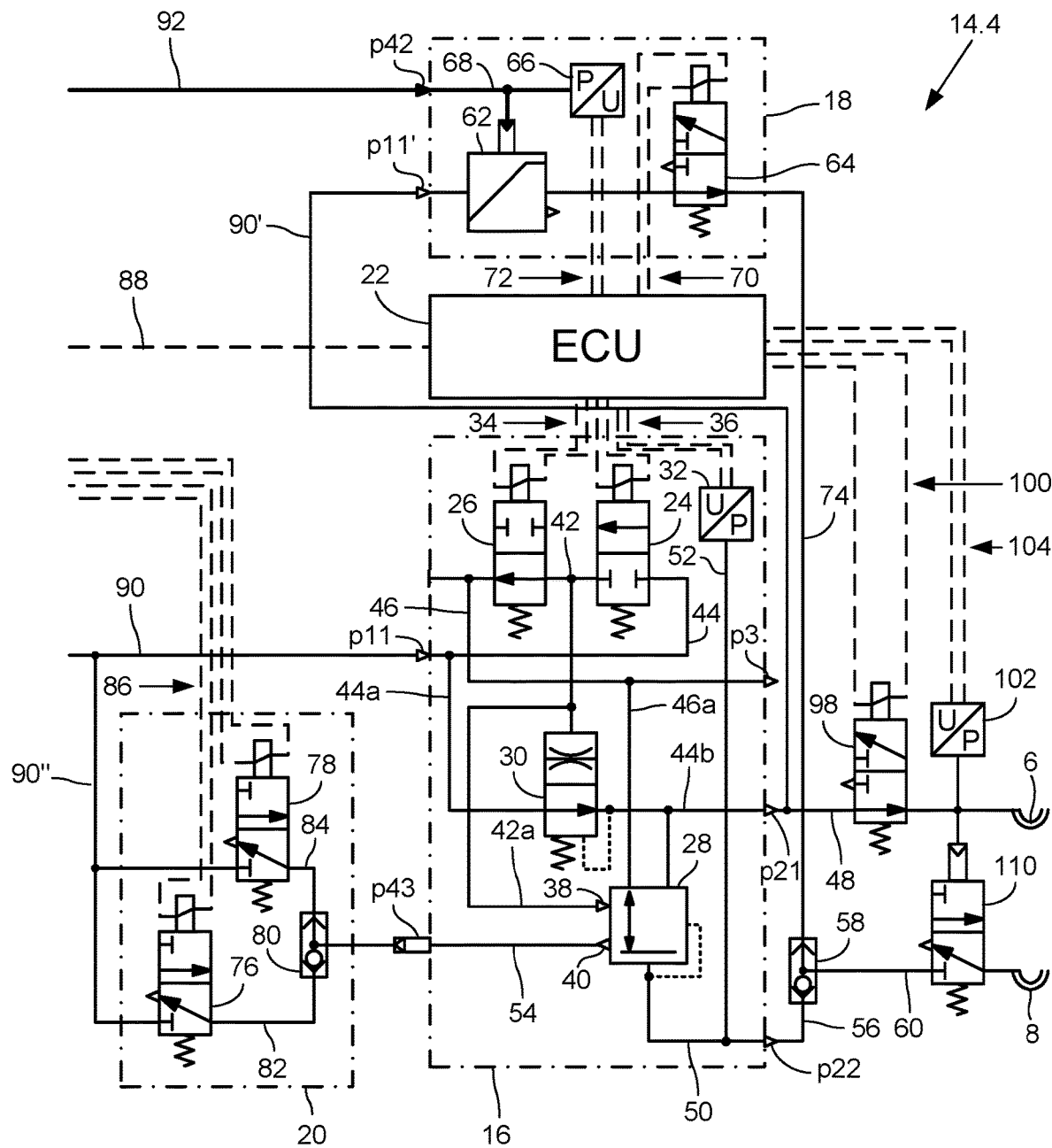
FIG. 11 shows a fourth embodiment of the valve arrangement according to the present disclosure in a schematic diagram.

The fourth embodiment of the valve arrangement 14.4 according to the present disclosure as shown in FIG. 11 differs from the first variant of the third embodiment of the valve arrangement 14.3 as per FIG. 9 in that a pneumatically pressure-controlled shut-off and ventilation valve 110 is arranged in the brake control line 60 between the output of the first shuttle valve 58 and the "brake" coupling head 8. It would however also be possible for the shut-off and ventilation valve 110 to be arranged in the brake control line 56 between the brake control output p22 of the trailer control valve 16 and the first input of the first shuttle valve 58.

The shut-off and ventilation valve 110 is formed as 3/2 directional switching valve with a control input which is connected to the reservoir pressure line 48 between the shut-off and ventilation valve 98 located there and the "reservoir" coupling head 6, an input connection connected to the output of the first shuttle valve 58, an output connection connected to the "brake" coupling head 8, and a ventilation output. When the control input of the shut-off and ventilation valve 110 is unpressurized, the input connection is shut off and the output connection is connected to the ventilation output. When the control input of the shut-off and ventilation valve 110 is pressurized, the input connection is connected to the output connection, and the ventilation output is shut off. Thus, the "brake" coupling head 8 is aerated when the "reservoir" coupling head 6 is aerated and thus pressurized, and the "brake" coupling head 8 is ventilated when the "reservoir" coupling head 6 is ventilated and thus unpressurized.

When the parking brake in the tractor vehicle 2 is engaged, the two coupling heads 6, 8 can, in this embodiment of the valve arrangement 14.4, be ventilated by means of corresponding actuation of the shut-off and ventilation valve 98 by means of the electronic control unit 22, in accordance with one of the three first method variants described above (see FIG. 3 to FIG. 5). Thus, in accordance with the first method variant, this is performed until such time as the parking brake of the tractor vehicle 2 is released again, or in accordance with the second method variant, this is performed until such time as a predetermined time period that is sufficient for the connection of the coupling head of the trailer vehicle 4 has expired, or in accordance with the third method variant, this is performed until such time as a pressure pulse repeatedly introduced into the reservoir pressure line 48 by brief opening of the shut-off and ventilation valve 98 results in a shallow pressure gradient.

Figure 12:
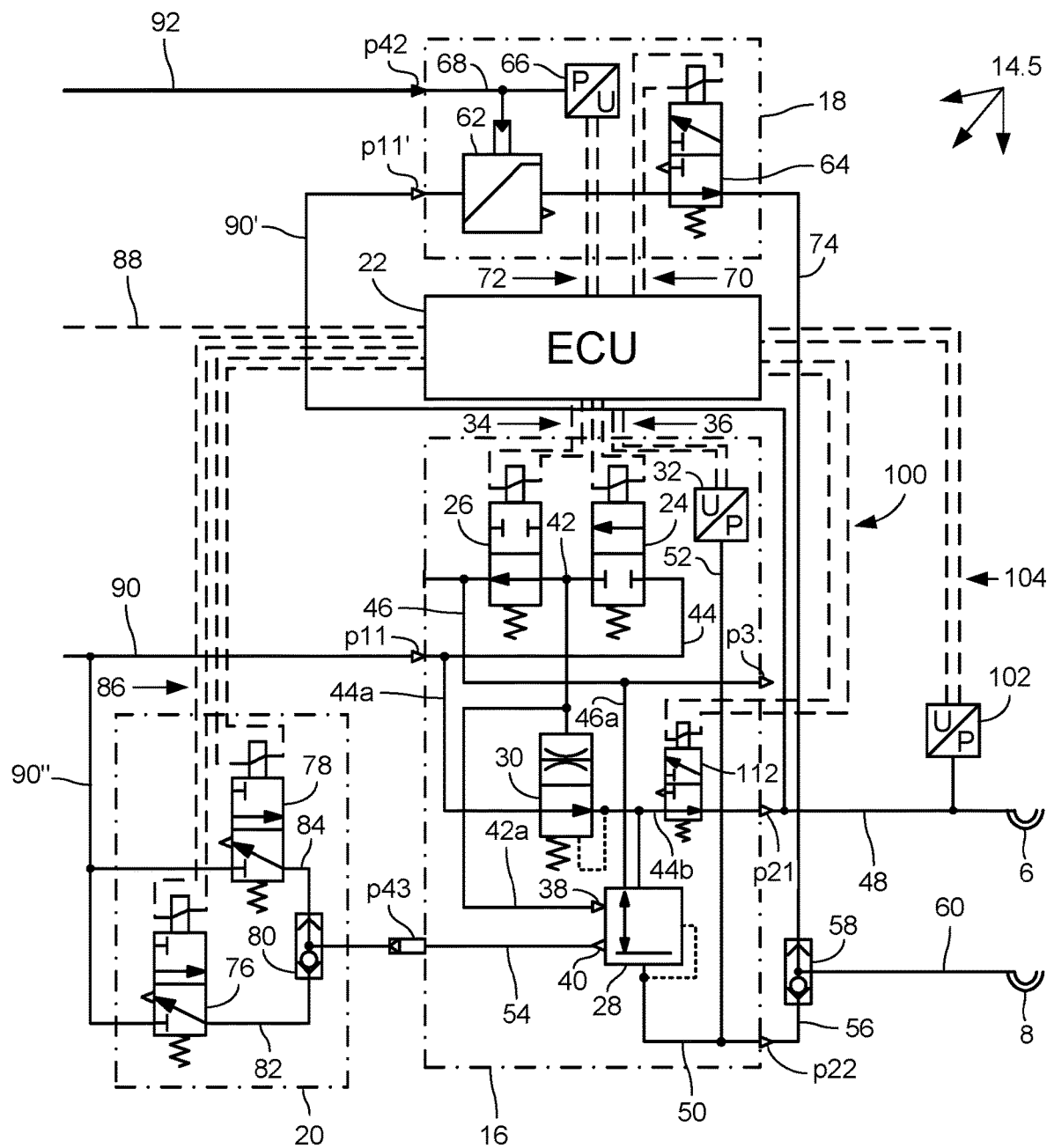
FIG. 12 shows a fifth embodiment of the valve arrangement according to the present disclosure in a schematic diagram.

The fifth embodiment of the valve arrangement 14.5 according to the present disclosure as shown by way of example in FIG. 12 differs from the second embodiment of the valve arrangement 14.2 as per FIG. 8, whilst functioning with the same action, in that the electronically controlled shut-off and ventilation valve 112 is now arranged directly upstream of the supply pressure output p21 of the trailer control valve 16 in an internal supply pressure line 44b located there. Here, both the supply pressure line 44b and the shut-off and ventilation valve 112 are formed or arranged so as to be structurally integrated in the trailer control valve 16. The shut-off and ventilation valve 112 is connected via electrical control lines 101 to the electronic control unit 22. With this valve arrangement 14.5, too, the supply pressure output p21 of the trailer control valve 16 can be shut off, and at the same time the "reservoir" coupling head 6 of the tractor vehicle 2 can be ventilated.

Figure 13:
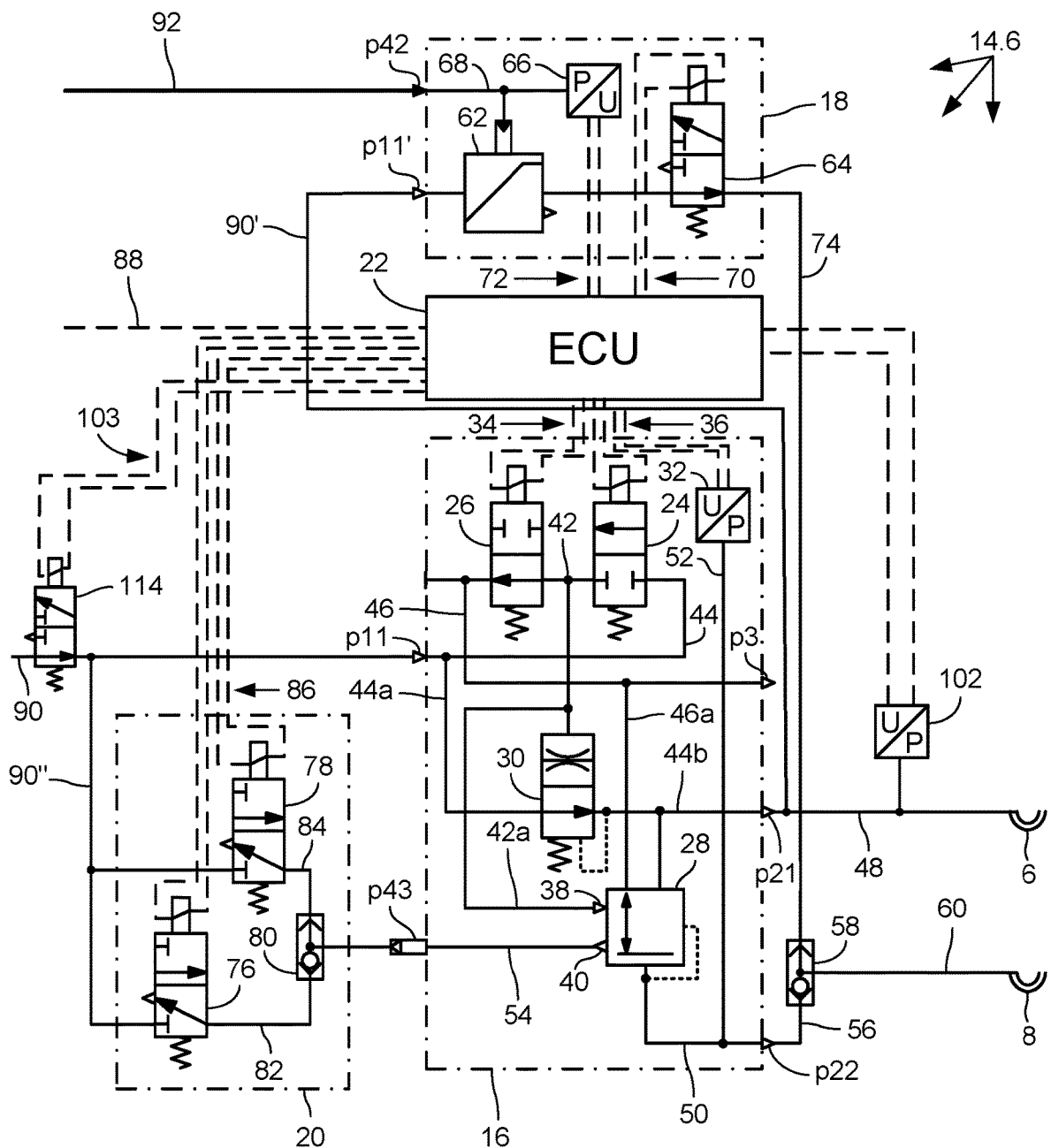
FIG. 13 shows a sixth embodiment of the valve arrangement according to the present disclosure in a schematic diagram.

Finally, FIG. 13 shows, by way of example, a sixth embodiment of the valve arrangement 14.6 according to the present disclosure. This differs from the second embodiment of the valve arrangement 14.2 as per FIG. 8, whilst functioning with the same action, in that the electronically controlled shut-off and ventilation valve 114 is now arranged upstream of the supply pressure input p11 of the trailer control valve 16 in the external supply pressure line 90. Here, the shut-off and ventilation valve 114 is arranged upstream of the branching point of the line section 90" for supply compressed air, which leads to the parking brake module 20. The shut-off and ventilation valve 114 is connected via electrical control lines 103 to the electronic control unit 22. This valve arrangement 14.6 allows the complete shutting-off of the valve arrangement 14.6 from a feed of reservoir compressed air, and at the same time allows ventilation of the "reservoir" coupling head 6 of the tractor vehicle 2.

LIST OF REFERENCE SIGNS (PART OF THE DESCRIPTION)

2 Tractor vehicle
4 Trailer vehicle
6 "Reservoir" coupling head (red)
8 "Brake" coupling head (yellow)
10 Reservoir pressure line
12 Brake control line
14 Valve arrangement (prior art)
14.1 Valve arrangement (first embodiment according to the present disclosure)
14.2 Valve arrangement (second embodiment according to the present disclosure)
14.3 Valve arrangement (third embodiment according to the present disclosure, first variant)
14.3' Valve arrangement (second variant of the valve arrangement 14.3)
14.4 Valve arrangement (fourth embodiment according to the present disclosure)
14.5 Valve arrangement (fifth embodiment according to the present disclosure)
14.6 Valve arrangement (sixth embodiment according to the present disclosure)

16 Trailer control valve
18 Backup valve
20 Parking brake module
22 Electronic control unit (ECU)
24 Inlet valve, 2/2 directional solenoid valve
26 Outlet valve, 2/2 directional solenoid valve
28 Relay valve
30 Breakaway valve
32 Trailer-control-valve-side pressure sensor
34 Control lines
36 Sensor lines
38 Direct control input
40 Inverted control input of the relay valve
42 Control pressure line
42a Line branch
44 Internal reservoir pressure line
44a First line section of a reservoir pressure line within the trailer control valve
44b Second line section of a reservoir pressure line within the trailer control valve
46 Ventilation line
46a Connection line
48 External reservoir pressure line (leading to "reservoir" coupling head)
50 Output-side brake control line
52 Sensor pressure line
54 Internal control pressure line
56 Brake control line
58 First shuttle valve
60 External brake control line
62 Relay valve
64 Redundancy valve
66 Backup-valve-side pressure sensor, brake value sensor
68 Internal control pressure line of the redundancy valve
70 Control lines
72 Sensor lines
74 External brake control line
76 First parking brake valve
78 Second parking brake valve
80 Second, parking-brake-module-side shuttle valve
82 First parking-brake-module-side brake control line
84 Second parking-brake-module-side brake control line
86 Control lines
88 Data bus, CAN bus
90 External, input-side reservoir pressure line
90' Connection line for reservoir compressed air
90" Line section of the reservoir pressure line 90
92 Connection line to hydraulic brake circuit of the tractor vehicle 2
94 Shut-off and ventilation valve, 3/2 directional switching valve
96 Shut-off and ventilation valve, 3/2 directional switching valve
97 Electrical switch
98 Shut-off and ventilation valve, 3/2 directional solenoid switching valve
99 Signal line at switch 97
100 Control lines
101 Control lines
102, 102' Pressure sensor
103 Control lines
104 Sensor lines
106 Shut-off and ventilation valve, 3/2 directional solenoid switching valve
108 Control lines
110 Shut-off and ventilation valve, 3/2 directional switching valve
112 Shut-off and ventilation valve, 3/2 directional switching valve in reservoir pressure line 44b
114 Shut-off and ventilation valve, 3/2 directional switching valve in the external, input-side reservoir pressure line 90
pB Brake control pressure
pV Reservoir pressure
p3 Ventilation output
p11 Reservoir pressure input
p11' Reservoir pressure input of the backup valve
p21 Reservoir pressure output
p22 Brake control output
p42 Brake pressure input, control pressure input of the backup valve
p43 Inverted control pressure input of the trailer control valve
PB Parking brake (actuation position)
VA/E Shut-off and ventilation valve
t Time
tK Point in time
tZ Point in time
t1, t2 Points in time
t3, t3' Points in time
t4, t4' Points in time
t5, t5' Points in time
ΔtI Pulse duration
ΔtT Timing cycle
ΔtZ Time period

The invention claimed is:

1. A valve arrangement for controlling a pneumatic brake system of a trailer vehicle coupled to a tractor vehicle having a reservoir coupling head, the valve arrangement comprising:
a trailer control valve with a reservoir pressure input for introducing reservoir compressed air;
a reservoir pressure output for a controlled discharge of reservoir compressed air, the reservoir pressure output being pneumatically connected to the reservoir coupling head of the tractor vehicle; and
a shut-off and ventilation valve arranged in a reservoir pressure line pneumatically upstream of the reservoir coupling head;
wherein the shut-off and ventilation valve is configured to shut off a feed of reservoir compressed air to the reservoir coupling head and to ventilate the reservoir coupling head before an associated coupling head of the trailer vehicle is connected to the reservoir coupling head of the tractor vehicle,
and wherein the shut-off and ventilation valve is configured to allow the reservoir coupling head to be charged again with reservoir compressed air after connecting the associated coupling head of the trailer vehicle to the reservoir coupling head of the tractor vehicle.

2. The valve arrangement as claimed in claim 1, wherein the shut-off and ventilation valve is integrated into the trailer control valve.

3. The valve arrangement as claimed in claim 1, wherein the shut-off and ventilation valve is arranged upstream of the reservoir pressure input of the trailer control valve in an external, input-side reservoir pressure line.

4. A valve arrangement for controlling a pneumatic brake system of a trailer vehicle coupled to a tractor vehicle having a reservoir coupling head, the valve arrangement comprising:
a trailer control valve with a reservoir pressure input for introducing reservoir compressed air;

a reservoir pressure output for a controlled discharge of reservoir compressed air, the reservoir pressure output being pneumatically connected to the reservoir coupling head of the tractor vehicle; and a shut-off and ventilation valve arranged in a reservoir pressure line pneumatically upstream of the reservoir coupling head;

wherein the shut-off and ventilation valve is configured to shut off a feed of reservoir compressed air to the reservoir coupling head and to ventilate the reservoir coupling head before an associated coupling head of the trailer vehicle is connected to the reservoir coupling head of the tractor vehicle, wherein the shut-off and ventilation valve is configured to allow the reservoir coupling head to be charged again with reservoir compressed air after connecting the associated coupling head of the trailer vehicle to the reservoir coupling head of the tractor vehicle, and wherein the shut-off and ventilation valve is arranged downstream of the reservoir pressure output of the trailer control valve and upstream of the reservoir coupling head of the tractor vehicle.

5. The valve arrangement as claimed in claim 1,
wherein the shut-off and ventilation valve is formed as a 3/2 directional solenoid switching valve with an input connection connected to the reservoir pressure output, an output connection connected to the reservoir coupling head, and a ventilation output, wherein the shut-off and ventilation valve has a non-actuated state, in which the input connection is connected to the output connection and the ventilation output is shut off, and an actuated state, in which the input connection is shut off and the output connection is connected to the ventilation output, and wherein the trailer control valve is switchable to ventilate and aerate a brake coupling head via a parking brake module.

6. The valve arrangement according to claim 1:
wherein the trailer control valve is further configured to set a brake control pressure to be conducted via a brake control output of the trailer control valve to a brake coupling head of the tractor vehicle, the trailer control valve further comprising:

an electronically controllable parking brake module configured to ventilate an inverted control input of the trailer control valve for activating wheel brakes of the trailer vehicle in a parking brake function, wherein the shut-off and ventilation valve includes a first shut-off and ventilation valve in a brake control line between the brake control output and the brake coupling head and a second shut-off and ventilation valve in the reservoir pressure line, wherein the first shut-off and ventilation valve in the brake control line is configured to shut down the brake control output of the trailer control valve and to ventilate the brake coupling head before an associated coupling head of the trailer vehicle is connected to the brake coupling head, and wherein the second shut-off and ventilation valve in the brake control line is configured to allow the brake coupling head to be pneumatically connected again to the brake control output, after connecting the associated coupling head of the trailer vehicle to the brake coupling head.

7. The valve arrangement as claimed in claim 6,
wherein the each of the first and second shut-off and ventilation valves is configured as a manually actuatable 3/2 directional switching valve with a ventilation output, the first shut-off and ventilation valve having an input connection connected to the reservoir pressure output and an output connection connected to the reservoir coupling head, and the second shut-off and ventilation valve having an input connection connected to the brake control output, and an output connection connected brake coupling head, wherein each of the first and second shut-off and ventilation valves has a non-actuated state, in which the input connection is connected to the output connection and the ventilation output is shut off, and an actuated state, in which the input connection is shut off and the output connection is connected to the ventilation output.

8. The valve arrangement as claimed in claim 6, wherein each of the first and second shut-off and ventilation valves is configured to be manually switchable to the actuated state, and lockable in the actuated state via a pushbutton.

9. The valve arrangement as claimed in claim 8, wherein each of the first and second shut-off and ventilation valves is configured to be unlocked and released to the non-actuated state by a further actuation of the pushbutton.

10. The valve arrangement as claimed in claim 8, wherein each of the first and second shut-off and ventilation valves is configured to be automatically unlocked and released to the non-actuated state after a predetermined holding time via a valve-internal resetting spring.

11. The valve arrangement as claimed in claim 6, wherein,
the first and second shut-off and ventilation valves are formed as 3/2 directional solenoid switching valves with an input connection connected to the respective output of the trailer control valve, an output connection connected to the respective coupling head, and a ventilation output, wherein in an electrically deenergized state, the input connection is connected to the output connection and the ventilation output is shut off, and in an electrically energized state, the input connection is shut off and the output connection is connected to the ventilation output.

12. The valve arrangement as claimed in claim 6,
wherein the second shut-off and ventilation valve in the reservoir pressure line between the reservoir pressure output and the reservoir coupling head, is an electrically actuatable shut-off and ventilation valve, and the first shut-off and ventilation valve in the brake control line between the brake control output and the brake coupling head is a pneumatically pressure-controlled shut-off and ventilation valve, wherein the second shut-off and ventilation valve in the reservoir pressure line is formed as a 3/2 directional solenoid switching valve with an input connection connected to the reservoir pressure output, with an output connection connected to the respective coupling head, and with a ventilation output, electrically actuatable shut-off and ventilation valve having electrically deenergized state, in which the input connection is connected to the output connection and the ventilation output is shut off, and having an electrically energized state, in which the input connection is shut off and the output connection is connected to the ventilation output, wherein the first shut-off and ventilation valve in the brake control line is formed as a 3/2 directional switching valve with a control input connected to the reservoir pressure line between the shut-off and ventilation valve located there and the reservoir coupling head, with an input connection connected to the brake control output, with an output connection connected to the brake coupling head, and with a ventilation output, the first shut-off and ventilation valve having an unpressurized state, in which the input connection is shut off and the output connection is connected to the ventilation output, and a pressurized state, in which the input connection is connected to the output connection and the ventilation output is shut off.

13. The valve arrangement as claimed in claim 6, wherein, for measuring the brake control pressure prevailing at the brake coupling head, a pneumatic pressure sensor is connected to the brake control line between the shut-off and ventilation valve and the brake coupling head.

14. The valve arrangement as claimed in claim 1, wherein, for measuring a reservoir pressure prevailing at the reservoir coupling head, a pneumatic pressure sensor is connected to the reservoir pressure line between the shut-off and ventilation valve and the reservoir coupling head.

15. The valve arrangement as claimed in claim 1, further comprising a manually actuatable electrical switch arranged on the tractor vehicle, wherein
the electrical switch is connected to the electronic control unit via a signal line, and
the manually actuatable electrical switch and the electronic control unit are configured to trigger an electrical energization of the shut-off and ventilation valve by actuation of the manually actuatable electrical switch and thus a ventilation of the reservoir coupling head.

16. A method for controlling a pneumatic brake system of a trailer vehicle by means of a valve arrangement of a tractor vehicle, which has a mechanically or electronic controllable trailer control valve, via which reservoir compressed air that is introduced into the valve arrangement via a reservoir pressure input can be conducted via a reservoir pressure output to a reservoir coupling head of the tractor vehicle, the method comprising the following steps:
before connecting an associated coupling head of the trailer vehicle to the reservoir coupling head of the tractor vehicle, shutting off a supply of reservoir compressed air to the reservoir coupling head of the tractor vehicle and ventilating the reservoir coupling head, and
after connecting the associated coupling head of the trailer vehicle to the reservoir coupling head of the tractor vehicle, enabling the supply of the reservoir compressed air to the reservoir coupling head and charging the reservoir coupling head again with reservoir compressed air.

17. The method according to claim 16, wherein the valve arrangement is further configured to set a brake control pressure and to conduct the brake control pressure via a brake control output to a brake coupling head of the tractor vehicle, wherein the valve arrangement further includes an electronically controllable parking brake module configured to ventilate an inverted control input of the trailer control valve for actuating wheel brakes of the trailer vehicle in a parking brake function, and the method comprising the following further steps:
during an engagement of the parking brake of the tractor vehicle corresponding to an actuated state of the parking brake, bringing the reservoir coupling head of the tractor vehicle into a ventilated state and keeping the brake coupling head of the tractor vehicle in the ventilated state.

18. The method as claimed in claim 16, wherein the tractor vehicle further includes a brake coupling head, the method further comprising:
keeping the reservoir coupling head and the brake coupling head of the tractor vehicle in the ventilated state until such time as the parking brake of the tractor vehicle is released again.

19. The method as claimed in claim 16, wherein the tractor vehicle further includes a brake coupling head, the method further comprising:
the reservoir coupling head and the brake coupling head of the tractor vehicle are kept in the ventilated state over a predetermined time period sufficient to allow a driver to exit a driver's cab of the tractor vehicle and to connect respective coupling heads of the trailer vehicle to the reservoir coupling head and to the brake coupling head of the tractor vehicle.

20. The method as claimed in claim 16, wherein the tractor vehicle further includes a brake coupling head, the method further comprising:
in the ventilated states of the reservoir coupling head and the brake coupling head of the tractor vehicle, introducing pressure pulses in a specified timing cycle into the reservoir pressure line leading to the reservoir coupling head;
measuring the pressure gradient in the reservoir pressure line;
keeping the reservoir coupling head and the brake coupling head of the tractor vehicle in the ventilated state upon detecting a steep pressure gradient;
detecting a shallow pressure gradient; and
ending the ventilated state of the reservoir coupling head and the brake coupling head of the tractor vehicle in response to detecting the shallow pressure gradient.

21. The method as claimed in claim 16, wherein the tractor vehicle further includes a brake coupling head, the method further comprising:
in the ventilated states of the reservoir coupling head and the brake coupling head of the tractor vehicle, introducing pressure pulses in a specified timing cycle into the brake control line leading to the brake coupling head of the tractor vehicle;
measuring the pressure gradient in the brake control line;
keeping the reservoir coupling head and the brake coupling head of the tractor vehicle in the ventilated state upon detecting a steep pressure gradient;
detecting a shallow pressure gradient; and
ending the ventilated state of the reservoir coupling head and the brake coupling head of the tractor vehicle in response to detecting the shallow pressure gradient.

22. The method as claimed in claim 16, wherein the tractor vehicle further includes a brake coupling head, the method further comprising:
in order to avoid a release of the wheel brakes of the tractor vehicle, ventilating first the reservoir coupling head of the tractor vehicle, and subsequently, after a time delay, ventilating the brake coupling head of the tractor vehicle.

23. The method as claimed in claim 16, wherein the ventilation of reservoir coupling head and brake coupling head of the tractor vehicle is performed by a shut-off and ventilation valve and a parking brake module, or by two shut-off and ventilation valves.

24. The method as claimed in claim 16, wherein the tractor vehicle further includes a brake coupling head, the method further comprising:
manually actuating an electrical switch connected in signal-transmitting fashion to the electronic control unit, to electrically energize the shut-off and ventilation valve by the control unit and to put the reservoir coupling head in the ventilated state.

\* \* \* \* \*

UNITED STATES PATENT AND TRADEMARK OFFICE
CERTIFICATE OF CORRECTION

PATENT NO. : 12,049,209 B2
APPLICATION NO. : 17/447719
DATED : July 30, 2024
INVENTOR(S) : Mirko Brütt et al.

Page 1 of 1

It is certified that error appears in the above-identified patent and that said Letters Patent is hereby corrected as shown below:

On the Title Page

Item (71) "Applicant":
"WABCO Europe BVBA, Brussels (BE)" should read -- ZF CV SYSTEMS GLOBAL GMBH, Bern (CH) --.

Item (73) "Assignee":
"ZF FRIEDRICHSHAFEN AG, Friedrichshafen (DE)" should read -- ZF CV SYSTEMS GLOBAL GMBH, Bern (CH) --.

Signed and Sealed this
Sixteenth Day of September, 2025

Coke Morgan Stewart
*Acting Director of the United States Patent and Trademark Office*